United States Patent [19]
Koyama et al.

[11] Patent Number: 5,111,244
[45] Date of Patent: May 5, 1992

[54] IMAGE-FORMING MACHINE WITH IMPROVED PROCESS AND OPTIONAL UNIT ASSEMBLIES

[75] Inventors: Shigeo Koyama, Ibaraki; Eiji Tsutsui, Amagasaki; Kazuhiro Kobayashi, Ikoma; Katsushi Horihata, Osaka; Hiroyuki Tanaka, Yamato Koriyama, all of Japan

[73] Assignee: Mita Industrial Co., Ltd., Osaka, Japan

[21] Appl. No.: 262,873

[22] Filed: Oct. 26, 1988

[30] Foreign Application Priority Data

| Oct. 30, 1987 | [JP] | Japan | 62-273663 |
| Nov. 19, 1987 | [JP] | Japan | 62-290740 |
| Nov. 30, 1987 | [JP] | Japan | 62-301775 |

[51] Int. Cl.$^5$ .................. G03G 15/00; G03G 21/00
[52] U.S. Cl. .................... 355/210; 355/232; 355/299
[58] Field of Search ............... 355/200, 210, 211, 232, 355/212, 299, 296

[56] References Cited

U.S. PATENT DOCUMENTS

| 4,236,807 | 12/1980 | Kuehnle | 355/210 |
| 4,325,626 | 4/1982 | Murata et al. | 355/211 |
| 4,335,950 | 6/1982 | Gunzelmann et al. | 355/200 |
| 4,376,577 | 3/1983 | Okamoto | 355/211 |
| 4,386,841 | 6/1983 | Wakao et al. | 355/200 |
| 4,588,280 | 5/1986 | Ogawa et al. | 355/200 |
| 4,647,178 | 3/1987 | Sasaki et al. | 355/200 |
| 4,708,455 | 11/1987 | Kubota et al. | 355/211 |
| 4,714,337 | 12/1987 | Nishino et al. | 355/200 |
| 4,740,817 | 4/1988 | Suzuki et al. | 355/315 |
| 4,760,424 | 7/1988 | Ohba et al. | 355/245 |
| 4,851,875 | 7/1989 | Tanimoto | 355/245 |
| 4,873,548 | 10/1989 | Kobayashi et al. | 355/211 X |
| 4,876,572 | 10/1989 | Nagatsuna | 355/200 X |
| 4,888,620 | 12/1989 | Fujino et al. | 355/211 |
| 4,912,563 | 3/1990 | Narita | 355/200 |

*Primary Examiner*—Fred L. Braun
*Attorney, Agent, or Firm*—Wenderoth, Lind & Ponack

[57] ABSTRACT

An image-forming machine includes an image-bearing member having a photosensitive material on its surface, a latent electrostatic image-forming device for forming a latent electrostatic image corresponding to image information on the photosensitive material, a developing device for developing the latent electrostatic image, a transfer device for transferring the toner image from the photosensitive material to a sheet material, a conveying mechanism for conveying the sheet material through a transfer zone, and a receiving section for receiving the sheet material conveyed through the transfer zone. An assembly provides an improved cooperation of an optical device of the image-forming device, a sheet receiving section and the developing device. A further assembly maintains a process unit having the image-bearing member and an optical unit having the optical device in a predetermined positional relationship. Another assembly facilitates mounting and detachment of the image-bearing member on and from a process unit frame.

29 Claims, 17 Drawing Sheets

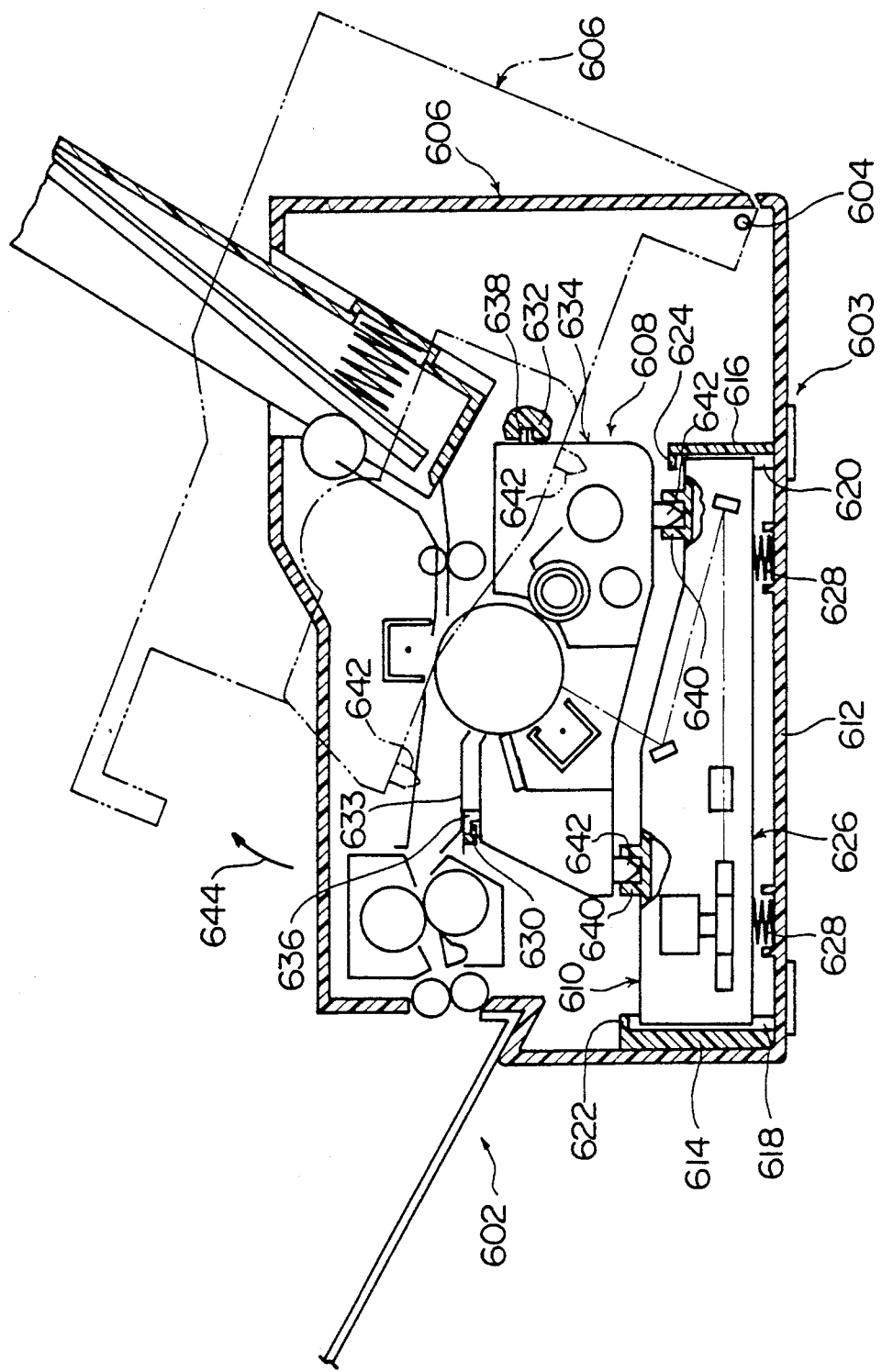

IMAGE-FORMING MACHINE WITH IMPROVED PROCESS AND OPTIONAL UNIT ASSEMBLIES

FIELD OF THE INVENTION

This invention relates to an image-forming as a laser beam printer.

DESCRIPTION OF THE PRIOR ART

An image-forming machine such as a laser beam printer generally comprises an image-bearing means such as a rotating drum having a photosensitive material on its surface, an optical means for projecting light having image information onto the surface of the photosensitive material, a developing device for developing a latent electrostatic image formed on the surface of the photosensitive material, a transfer means for transferring a toner image developed by the action of the developing device onto a sheet material, and a conveying means for conveying the sheet material through a transfer zone.

The conventional image-forming machine, however, does not prove to be entirely satisfactory, and the following problems still have to be solved.

Firstly, in an image-forming machine of the type in which a receiving section for receiving the discharged sheet material is defined by an upper wall of a main body of the machine, a main part of a light path of the optical means extends substantially horizontally, whereas a receiving surface of the receiving section defined by the upper surface of the upper wall of the main body of the machine extends horizontally while being inclined at a predetermined angle. Accordingly, it will be easily understood that a relatively large, nearly triangular space occurs between the optical means and the receiving section, and this wasteful space makes the entire machine large in size.

Secondly, in an ordinary image-forming machine including the image-forming machine of the above type, the main part of the light path of the optical means extends substantially horizontally. Hence, insufficient space exists below the optical means and on one side of the image-bearing means. When the developing device is disposed in this space, a toner holding chamber thereof cannot be increased in size, and the toner should be supplied relatively incessantly. The space may be increased by providing the entire optical means further upwardly. Such a structure, however, produces a wasteful space and increases the size of the machine as a whole.

Thirdly, in an image-forming machine of the type in which the image-bearing means is constructed as a process unit and the process unit is adapted to be mounted on the main body of the machine in which an optical unit is provided, it is important to maintain the process unit and the optical unit in a predetermined positional relationship. In the prior art, a structure for maintaining this positional relationship is complex, and it is difficult to maintain these units accurately in the desired positional relationship.

Fourthly, in an image-forming machine of the type in which the image-bearing means is mounted detachably on a unit frame of the process unit and the process unit is detachably mounted on the main body of the machine, it is not easy to mount the image-bearing means on, and detach it from, the unit frame because of the structure of the unit frame. Particularly, where the image-bearing means is constructed of a rotating drum, it is not easy to mount the rotating drum on the unit frame, and the photosensitive material on the surface of the rotating drum is likely to be damaged at the time of mounting the rotating drum.

SUMMARY OF THE INVENTION

A first object of this invention is to provide an excellent image-forming machine which can be reduced in size with regard to the arrangement of the optical means and the receiving section.

A second object of this invention is to provide an excellent image-forming machine which can be reduced in size in spite of the fact that a relatively large space for the developing device is provided on one side of the image-bearing means owing to the arrangement of the image-bearing means, optical means and the developing device.

A third object of this invention is to provide an excellent image-forming machine in which the process unit and the optical unit can be maintained accurately and surely in a predetermined positional relationship.

A fourth object of this invention is to provide an excellent image-forming machine in which the distance between the process unit and the optical unit can be maintained constant.

A fifth object of this invention is to provide an excellent image-forming machine in which it is easy to mount the image-bearing means on, and detach it from, the unit frame.

A sixth object of this invention is to provide an excellent image-forming machine in which the image-bearing means in the form of a rotating drum can be easily mounted on the unit frame.

Other objects of the invention along with its characteristic features will be understood from the following description.

BRIEF DESCRIPTION OF THE DRAWINGS

FIG. 20 is a sectional view showing a third modified embodiment of the laser beam printer in a simplified manner.

DETAILED DESCRIPTION OF THE PREFERRED EMBODIMENTS

The preferred embodiments of the present invention will be described in detail with reference to the accompanying drawings. It should be understood that while these embodiments will be described as applied to a laser beam printer, they are equally applicable to other image-forming machines such as an electrostatic copying machine.

Outline of the Laser Beam Printer

Figure 1:
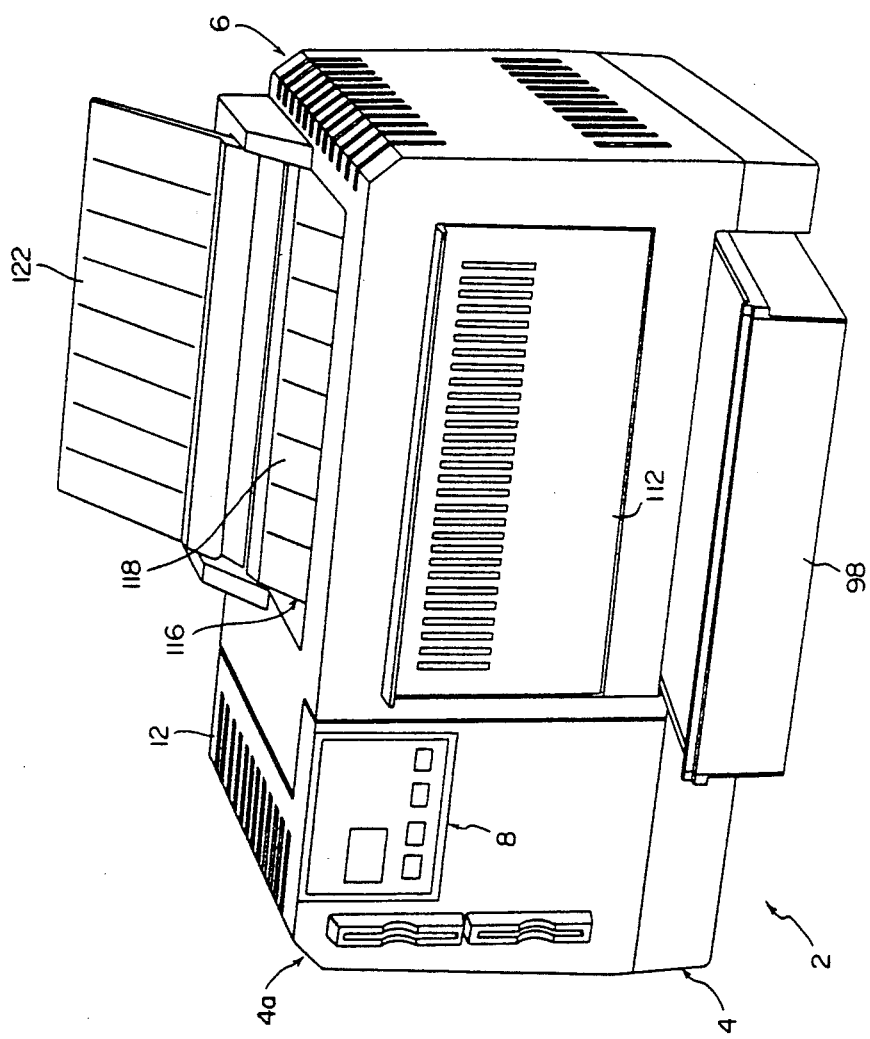
FIG. 1 is a perspective view showing one embodiment of a laser beam printer as one example of an image-forming machine constructed in accordance with this invention.
Figure 2:
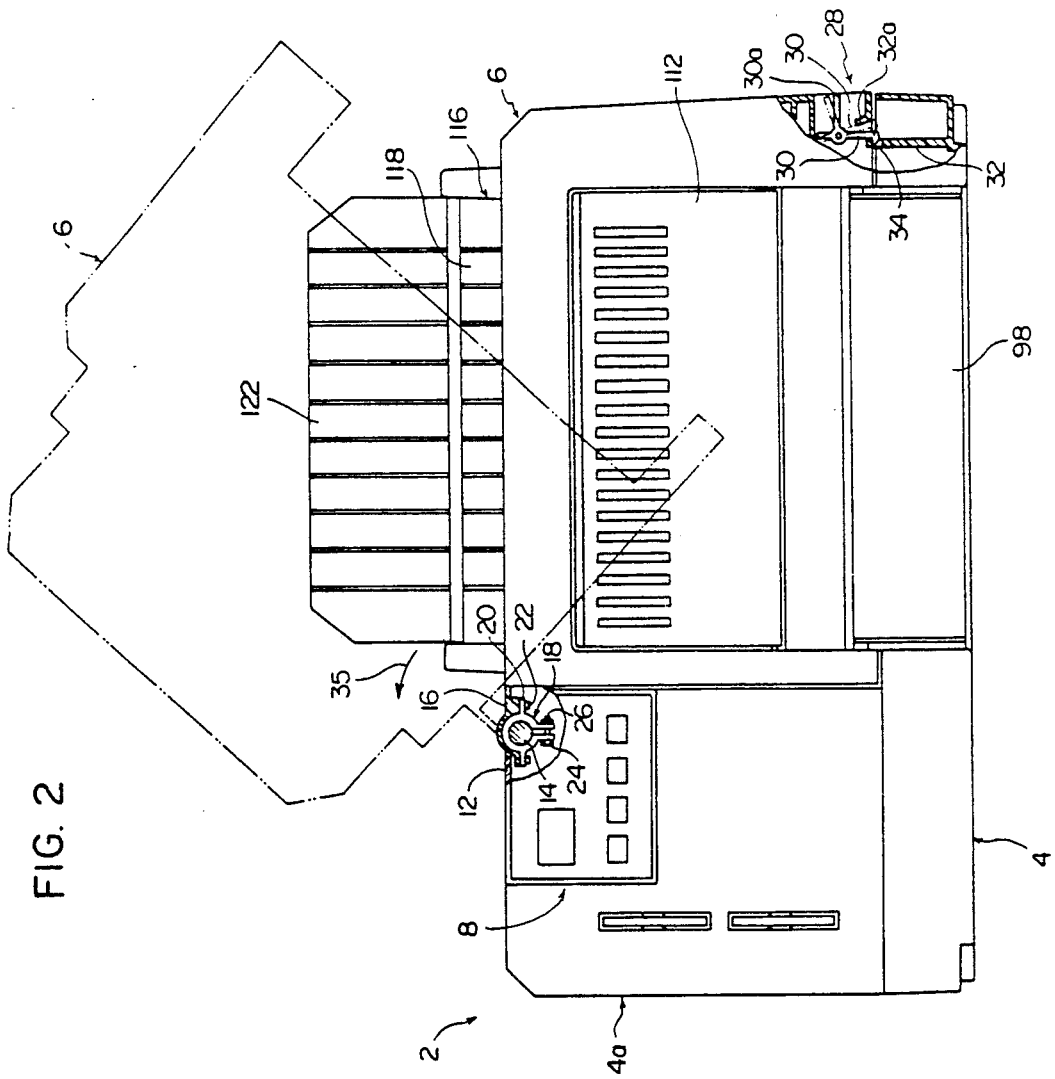
FIG. 2 is a front view of the laser beam printer of FIG. 1 shown partly broken away.
Figure 3:
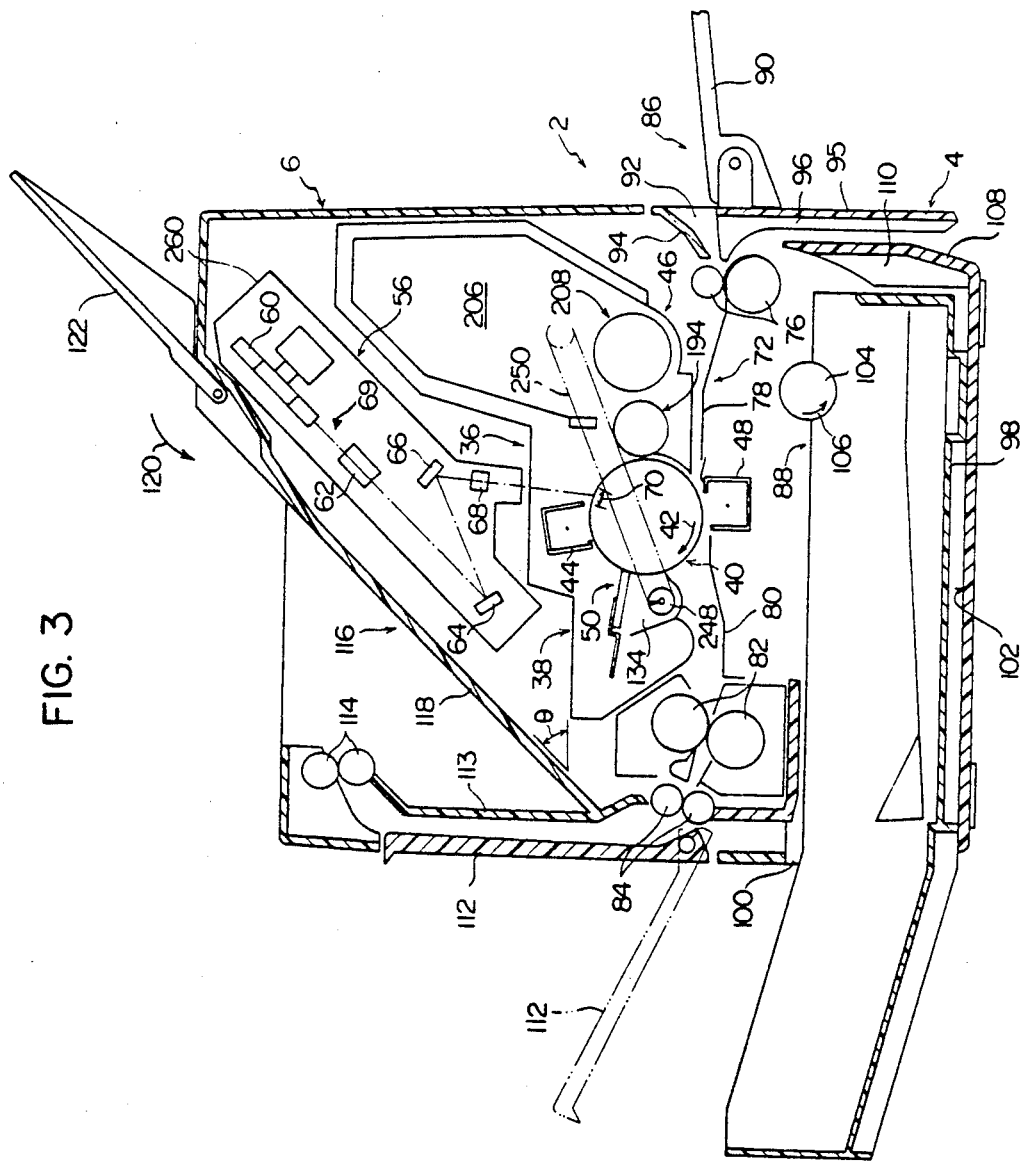
FIG. 3 is a sectional view showing the laser beam printer of FIG. 1 in a simplified manner.

With reference to FIGS. 1 to 3, the illustrated laser beam printer has a main body shown by reference numeral 2. The main body 2 is provided with a lower section 4 whose left portion 4a in FIGS. 1 and 2 projects upwardly. An opening-closing housing 6 is disposed in the right upper portion of the lower section 4. An operating panel 8 is provided in the front surface of the left portion 4a of the lower section 4.

The housing 6 is mounted on the lower section 4 in the following manner.

With reference mainly to FIG. 2, a supporting shaft 14 extending in the front-rear direction (in the direction from left bottom to right top in FIG. 1, in the direction perpendicular to the sheet surface in FIG. 2, and in the left-right direction in FIG. 3) is mounted on the inside of an upper wall 12 of the left portion 4a of the lower section 4. A pair of fixing projections 16 (only one of which is shown in FIG. 2) are provided in the upper end portion of the housing 6 with a space therebetween in the front-rear direction. A linking member 18 is attached to each of the fixing projections 16. The linking member 18 is nearly U-shaped as a whole and a partly open, nearly circular hole is formed in its center. In an intermediate portion are provided a pair of protrusions 20, and by threadably securing a fixing screw 22 to the fixing projection 16 through the protrusion 20, the linking member 18 is attached as is required. The opening-closing housing 6 and the lower section 4 of the main body are linked to each other pivotally via the supporting shaft 14 and the linking member 18 by positioning the supporting shaft 14 within the hole of each linking member 18 and then threadingly securing a bolt 24 and a nut 26 through both end portions of the linking member 18. A locking means 28 is interposed between the lower section 4 of the main body and the opening-closing housing 6. The illustrated locking means 28 is comprised of an engaging member 30 mounted for free pivoting movement between a locked position in the right bottom of the housing 6 (the position shown by solid lines in FIG. 2) and a non-locked position (the position shown by two-dot chain lines in FIG. 2) and an engaging opening 34 formed in a wall 32 of the lower section 4 of the main body. When the engaging member 30 is at the locked position, a claw portion thereof engages the engaging opening 34. Thus, when the housing 6 is at the closed position shown by the solid lines in FIG. 2, the claw portion of the engaging member 30 engages the engaging opening 34 to lock the housing 6 releasably at the closed position. On the other hand, when an operating portion 30a of the engaging member 30 is pivoted upwardly through an opening formed in the right bottom part of the housing 6, the engaging member 30 is held at the non-locked position, whereby the claw portion of the engaging member 30 comes out of engagement with the engaging opening 34 and the locking means 28 becomes nonlocked. A protrusion 32a is provided integrally in part of the wall 32 of the lower section 4 of the main body. When the engaging member 30 abuts with this protrusion 32a, the pivoting movement of the engaging member 30 beyond the non-locked position is accurately hampered. When thereafter the housing 6 is pivoted in the direction shown by an arrow 35, it moves crosswise about the supporting shaft 14, i.e. about a central pivot axis extending in the front-rear direction, and is held at the open position shown by two-dot chain lines in FIG. 1. It will be easily understood from FIG. 2 that when both end portions of the linking member 18 are clamped relatively strongly by the bolt 24 and the nut 26, the frictional force between the inner surface of the linking member 18 and the peripheral surface of the supporting shaft 14 becomes relatively large and the force required for opening and closing the housing 6 is great. On the other hand, when both end portions of the linking member 18 are clamped relatively weakly by the bolt 24 and the nut 26, the frictional force between the inner surface of the linking member 18 and the peripheral surface of the supporting shaft 14 becomes relatively small, and consequently, the force required for opening and closing the housing 6 is slight.

A process unit shown generally at 36 is mounted on the main body 2. With reference mainly to FIG. 3, the illustrated process unit 36 has a process unit frame 38 on which a rotating drum 40 constituting an image-bearing means is mounted rotatably. An electrographic photosensitive plate is disposed on the peripheral surface of the rotating drum 40. Around the rotating drum 40 rotating in the direction shown by an arrow 42 are disposed a charging corona discharger 44, a developing device 46, a transfer corona discharger 48 and a cleaning device 50. The charging corona discharger 44, the developing device 46 and the cleaning device 50 are mounted on the unit frame 38. The process unit 36 will be described in more detail hereinafter.

In the upper portion of the main body 2, and above the process unit 36, is disposed an optical unit 56. The optical unit 56 includes a laser beam source 58 (FIG. 11), a rotating polygon mirror 60, an fθ lens 62, a first reflecting mirror 64, a second reflecting mirror 66 and a cylindrical lens 68. The laser beam source 58 irradiates a laser beam based on image information outputted from, for example, a computer toward the polygon mirror 60. The laser beam reflected from the rotating polygon mirror 60 passes through the fθ lens 62 and reaches the first reflecting mirror 64, is reflected by the first and second reflecting mirrors 64 and 66, further passes through the cylindrical lens 68, and is projected onto the surface of the rotating drum 40 in a projecting zone 70, as shown by one-dot chain lines.

A conveying mechanism shown generally at 72 is disposed in the lower portion of the main body 2 and below the process unit 36. The conveying mechanism 72 defines a conveying passage for conveying a sheet material such as a recording paper through a transfer zone, and includes a conveyor roller pair 76, a guide plate 78, a guide plate 80, a fixing roller pair 82 and a lower discharge roller pair 84. In the illustrated embodiment, the upstream end of the conveying passage is bifurcated. One part extends in a straight line to the right in FIG. 3 and a hand-insertion feed means 86 is provided in its upstream end. The other part curves and extends downwardly, and an automatic feed means 88 is provided at its upstream end (specifically, below the conveying mechanism 72 and at the bottom part of the lower section 4). The hand-insertion feed means 86 includes a table 90 which is free to pivot between a feed position shown in FIG. 3 and a storage position (not shown) displaced upwardly. When the hand-insertion feed means 86 is to be utilized, the table 90 is held at the feed position. When a sheet material is positioned on the table 90 and inserted into the main body 2 through an opening 92 defined in the right surface (FIG. 3) of the lower section 4 of the main body, the sheet material is conducted to the conveyor roller pair 76 through a space between the under surface of a guide piece 94 and the upper end edge of a guiding protrusion 96 provided on the inner surface of a wall 95 of the lower section 4 of the main body. The illustrated automatic feed means 88 includes a cassette 98 in which sheet materials are stacked. The cassette 98 is detachably loaded into a cassette receiving section 102 defined in the lower section 4 of the main body through an opening 100 formed in the front surface (left surface in FIG. 3) of the lower section 4 (see FIGS. 1 and 2 also). A feed roller 104 is disposed above the cassette-receiving section 102. By rotating the feed roller 104 in the direction shown by an arrow 106, the sheet materials in the cassette 98 are delivered one by one. The delivered sheet material is guided by a guiding protrusion 110 provided in an upstanding wall portion 108 of the lower section 4 of the main body and the above guiding protrusion 96 and conducted to the conveyor roller pair 76.

The downstream end of the conveying passage is also bifurcated, and in regard to this structure, a rectangular opening-closing portion 112 in the front surface of the housing 6 is adapted to be selectively held at a first position shown by two-dot chain lines in FIG. 3 and a second position shown by solid lines in FIG. 3 (the positions also shown in Figures 1 and 2). When the opening-closing portion 112 of the housing 6 is at the first position, the sheet material delivered from the lower discharge roller pair 84 is discharged directly out of the housing 6 and received an inside surface (the upper surface in the state shown by the two-dot chain lines) of the opening-closing portion 112. Hence, at the first position, the opening-closing portion 112 functions as a first receiving section. On the other hand, when the opening-closing portion 112 is in the second position, the sheet material delivered from the lower discharge roller pair 84 is further conveyed upwardly, passing between the opening-closing portion 112, and a part 113 of the housing 6 and by the action of an upper discharge roller pair 114 is discharged into a receiving section 116 (functioning as a second receiving section) defined in the upper surface of the housing 6. In the illustrated embodiment, the receiving section 116 is defined by an upwardly inclined wall 118 in the housing 6, and on the upper end portion of the upwardly inclined wall 118 is mounted an auxiliary receiving member 122 which is free to pivot between a receiving position shown in FIGS. 1 to 3 and a storage position pivoted about 180 degrees from the receiving position in the direction shown by an arrow 120.

The operation of the laser beam printer described above will be described below briefly.

While the rotating drum 40 is rotated in the direction of arrow 42, the charging corona discharger 44 charges the photosensitive material of the rotating drum 40. Then, a laser beam from the laser beam source 58 of the optical unit 56 is projected onto the photosensitive material in the projecting zone 70. Consequently, a latent electrostatic image corresponding to the image formation is formed on the surface of the photosensitive material by the action of a latent electrostatic image forming means composed of the charging corona discharger 44 and the optical unit 56. Then, a toner is applied to the latent electrostatic image on the photosensitive material by the action of the developing device 46 to develop it into a toner image. A sheet material fed into the conveying passage from the hand insertion feed means 86 of the automatic feed means 88 is brought into contact with the photosensitive material in the transfer zone, and by the action of the transfer corona discharger 48, the toner image on the photosensitive material is transferred to the sheet material. The sheet material having the toner image transferred thereto is peeled from the rotating drum 40, and the toner image is fixed to the surface of the sheet material by the action of the fixing roller pair 82. The sheet material having the fixed toner image is conveyed to the lower discharge roller pair 84, and when the opening-closing portion 112 is at the first position, directly discharged onto the opening-closing portion 112. It will be understood from FIG. 3 that in this case, the sheet material is discharged with its image-bearing surface directed upwardly. On the other hand, when the opening-closing portion 112 is at the second position, the sheet material conveyed to the lower discharge roller pair 84 is further conveyed upwardly, and discharged into the receiving section 116 by the action of the upper discharge roller pair 114. In this case, the sheet material is discharged with the image-bearing surface directed downwardly, as can be seen from FIG. 1, and no rearrangement of the order of the pages of the discharged sheet materials is necessary.

In the meantime, the rotating drum 40 continues to rotate, and by the action of the cleaning device 50, residual toner is removed from the surface of the photosensitive material.

Process Unit

Figure 4:
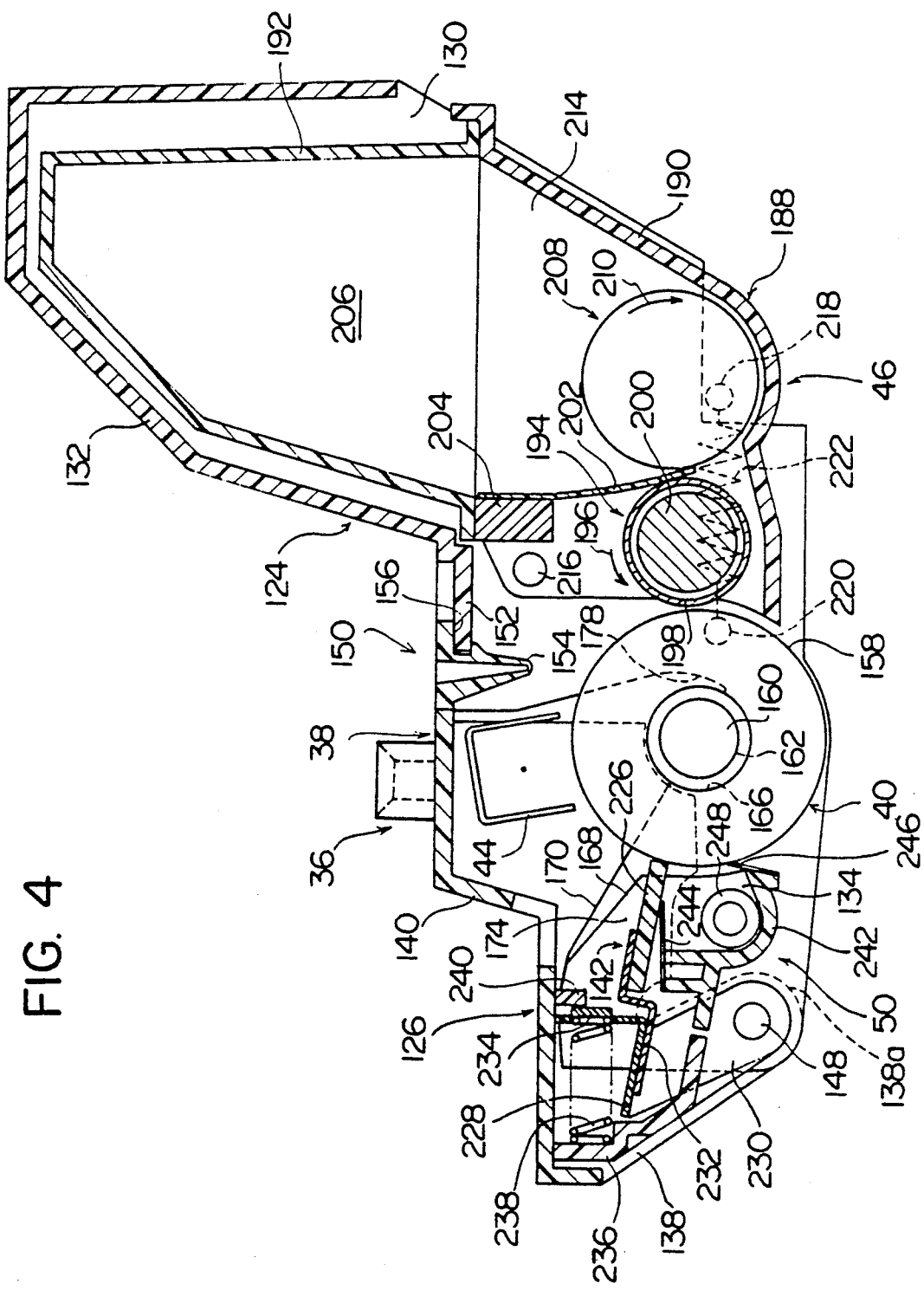
FIG. 4 is a sectional view showing a process unit in the laser, beam printer of FIG. 1.
Figure 5:
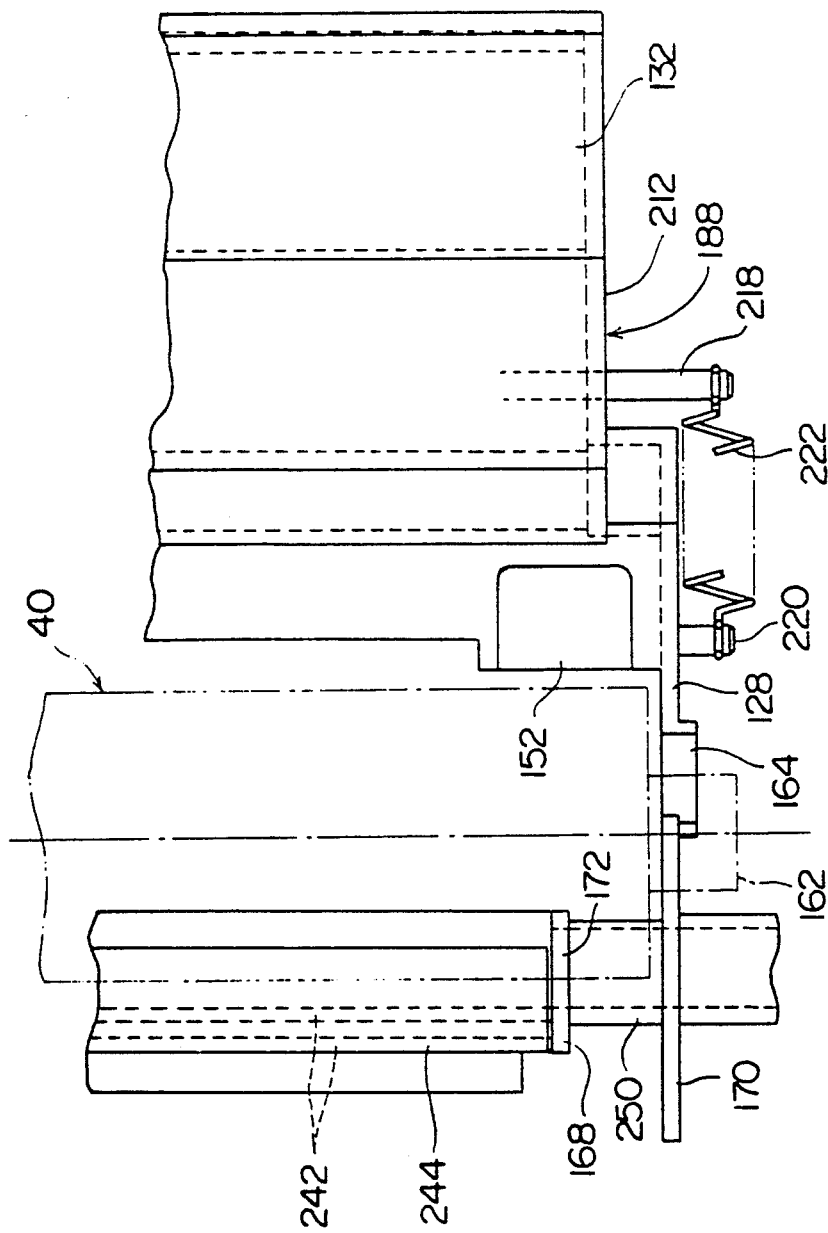
FIG. 5 is a top plan view showing partly a first frame member of the process unit of FIG. 4 and various constituent elements mounted on the frame member.

With reference to FIGS. 4 and 5 as well as FIG. 3, mainly to FIG. 4, the process unit 36 will be described.

Figure 7:
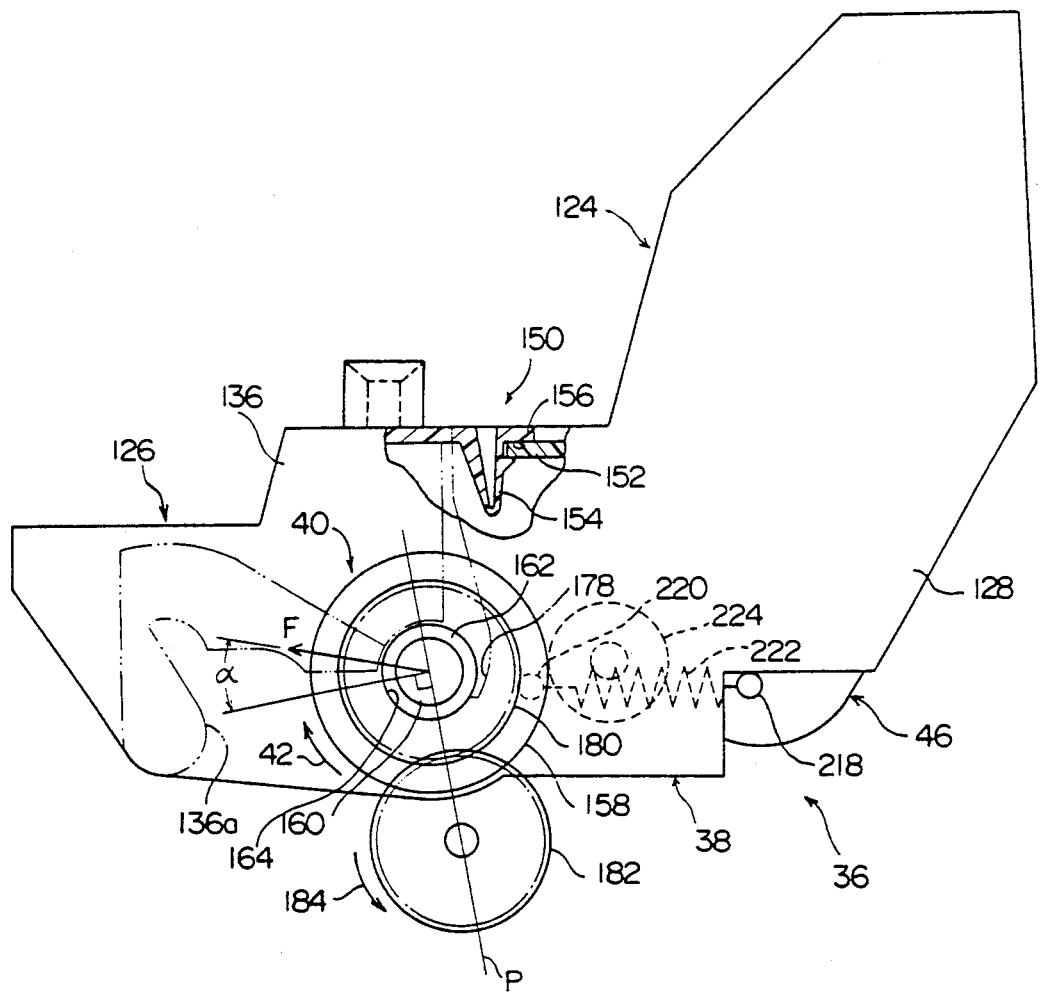
FIG. 7 is a partly broken-away sectional view illustrating supporting of the rotating drum.

The illustrated process unit 36 is provided with a first frame member 124 disposed in the right portion in FIG. 4, and a second frame member 126 disposed in the left portion in FIG. 4. The first frame member 124 has a pair of end walls 128 and 130 (FIG. 5 shows one end wall 128 and FIGS. 3 and 4, the other end wall 130) spaced from each other in a direction (the vertical direction in FIG. 5) perpendicular to the sheet surface in FIGS. 3 and 4, and an upper wall 132 is provided between the end walls 128 and 130. As will be described later, the rotating drum 40 and the developing device 46 are mounted on the first frame member 124, and a toner recovery chamber 134 in the cleaning device 50 is provided. The second frame member 126 has a pair of end walls 136 and 138 (FIG. 7 shows one end wall 136, and FIGS. 3 and 4, the other end wall 138) spaced from each other in a direction perpendicular to the sheet surface in FIGS. 3 and 4, and an upper wall 140 is disposed between the end walls 136 and 138. The charging corona discharger 44 and the toner removing means 142 in the cleaning device 50 are mounted on the second frame member 126.

Figure 6:
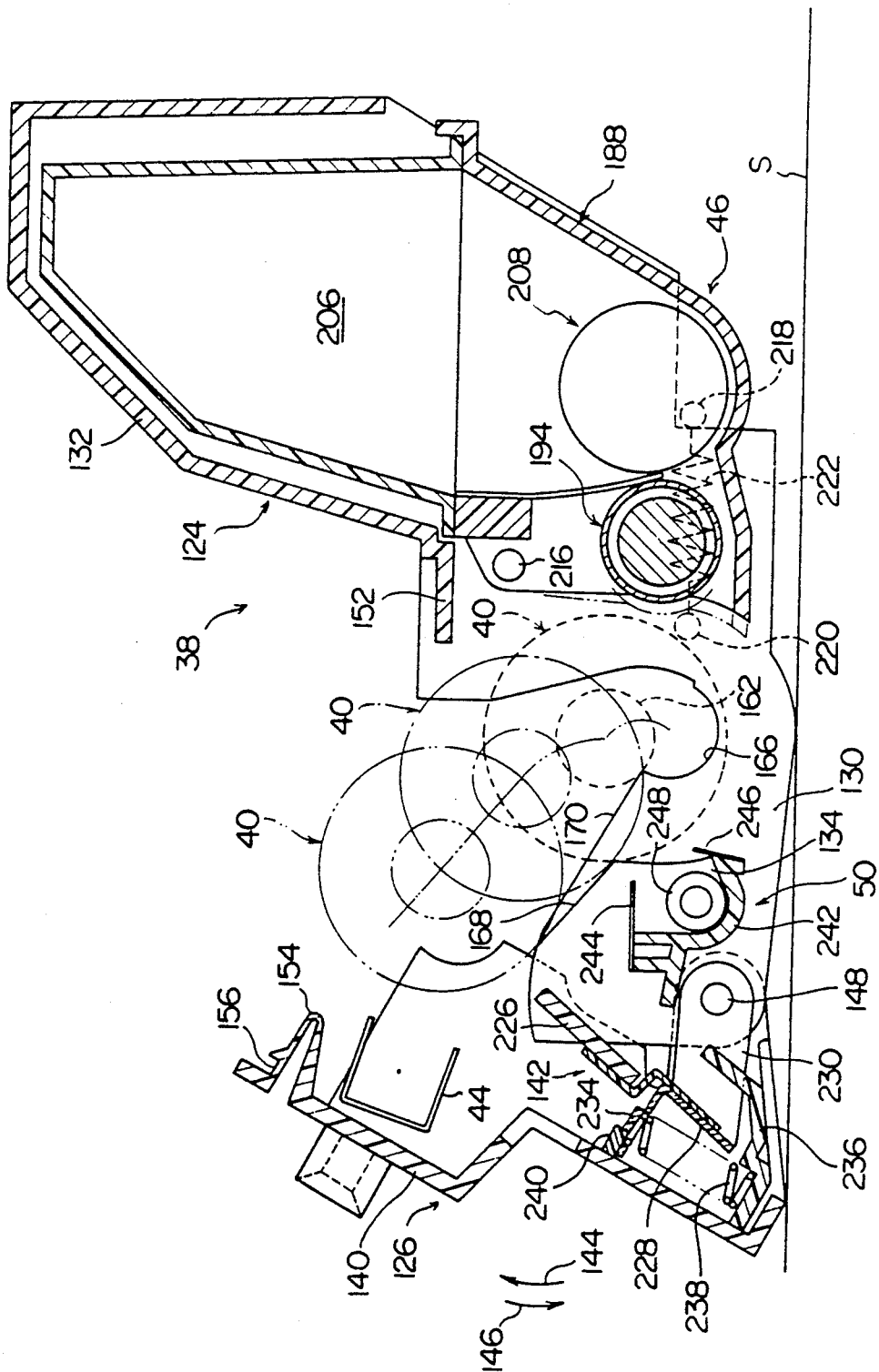
FIG. 6 is a sectional view illustrating the operation of mounting a rotating drum on the unit frame of the process unit shown in FIG. 4.

The first frame member 124 and the second frame member 126 are mounted so as to be free to pivot in the directions shown by arrows 144 and 146 (FIG. 6). The end walls 136 and 138 of the second frame member 126 are positioned outwardly of the end walls 128 and 130 of the first frame member 124, and the left end portion of the end wall 128 of the first frame member 124 is pivotally connected to a lower projecting portion 136a formed in the end wall 136 of the second frame member 126 via a linking pin (not shown). Furthermore, the left end portion of the end wall 130 of the first frame member 124 is pivotally connected to a lower projecting portion 138a formed in the end wall 138 of the second frame member 126 via a linking pin 148. When the second frame member 126 is pivoted in the closing direction shown by arrow 144 and held at an operative position, the second frame member 126 and the first frame member 124 are maintained in the positional relationship shown in FIG. 4. On the other hand, when the process unit 36 is placed on a surface S such as a table surface and pivoted in the opening direction shown by arrow 146 from the operative position, the left end of the second frame member 126 abuts with the surface S, and the second frame member 126 and the first frame member 124 are maintained in the positional relationship shown in FIG. 6.

In the illustrated embodiment, an operative position locking means 150 is provided which releasably locks the second frame member 126 at the operative position. The locking means 150 is comprised of a protruding portion 152 provided in the left end portion in FIGS. 4 and 5 of the upper wall 132 of the first frame member 124 and a receiving portion 156 defined in an elastically deformable portion 154 provided in the right end portion in FIG. 4 of the upper wall 140 of the second frame member 126.

Accordingly, when the second frame member 126 is held at the operative position, the protruding portion 152 of the upper wall 132 is detachably received by the receiving portion 156 in the elastically deformable portion 154, and thus locked in the operative position by the locking means 150, and this locked state is maintained by the recovering force of the elastically deformable portion 154.

The rotating drum 40 is mounted on the unit frame 38 in the following manner. With reference to FIGS. 4 to 6, the rotating drum 40 has a cylindrical portion 158 having a photosensitive material disposed on its peripheral surface and shaft portion 160 provided at opposite end surfaces of the cylindrical portion 158. A bearing member 162 is mounted on each of the shaft portions 160. On the other hand, receiving portions 164 and 166 (FIG. 5 shows one receiving portion 164, and FIGS. 4 and 6, the other receiving portion 166) are provided nearly centrally in the left-right direction in FIGS. 4 and 5 in the end walls 128 and 130, respectively, of the first frame member 124. The receiving portions 164 and 166 are nearly circular with an open top, and are defined by upper edges of the end walls 128 and 130. A first guide portion 168 and a second guide portion 170 are provided in the first frame member 124 to facilitate the mounting of the rotating drum. In the illustrated embodiment, inner walls 172 and 174 (FIG. 5 shows one inner wall 172, and FIGS. 4 and 6, the other inner wall 174) are disposed inwardly of the left portions of the end walls 128 and 130 respectively, of the first frame member 124. These inner walls 172 and 174 function as the first guide portion 168. The inner walls 172 and 174 are disposed at positions corresponding to both end parts of the cylindrical portion 158 of the rotating drum 40 on which no photosensitive material substantially exists, or an image is not substantially formed even when the photosensitive material exists. The upper surfaces of these inner walls are comparatively greatly inclined downwardly rectilinearly toward the receiving portions 164 and 166. The left portions of the end walls 128 and 130 function as the second guide portion 170. The left portions of the end walls 128 and 130 are positioned correspondingly to the shaft portions 160 of the rotating drum 40 (in the illustrated embodiment, the bearing members 162 are mounted thereon), and their upper surfaces are comparatively gently inclined downwardly rectilinearly from the left end of the unit frame 38 to the receiving portions 164 and 166. In mounting the rotating drum 40, both end parts of the cylindrical portion 158 of the rotating drum 40 are first positioned on the first guide member 168 (the inner walls 172 and 174) as shown in Figure 6, and moved downwardly to the lower end portion of the first guide portion 168 along the guiding surface of the first guide portion 168. Then, the rotating drum 40 is allowed to fall further downwardly and its shaft portions 160 (the bearing members 162) are positioned on the second guide portion 170 (the left portions of the end walls 128 and 130) and the rotating drum is moved slightly downwardly along the guiding surface of the second guide portion 170. Thereafter, the shaft portions 160 are allowed to fall into the receiving portions 164 and 166 defined by the end walls 128 and 130. Thus, the shaft portions 160 of the rotating drum 40 are detachably received in the receiving portions 164 and 166 of the end walls 128 and 130. To detach the rotating drum 40 from the unit frame 38, it is lifted in such a manner as to detach the shaft portions 160 from the receiving portions 164 and 166.

With regard to the receiving portions 164 and 166, it is preferred to employ the structure shown in FIG. 7. Firstly, it is preferred to provide an enlarged portion 178 in the upper parts of the receiving portions 164 and 166 (for the receiving portion 166, see FIGS. 4 and 6), more specifically in the upper side of that part of the receiving portions 164 and 166 which make contact with the bearing members 162, by forming a depressed portion, for example. By this structure, the introducing parts of the receiving portions 164 and 166 are slightly enlarged, and the shaft portions 160 of the rotating drum 40 can be easily mounted in, and detached from, the receiving portions 164 and 166. Secondly, the receiving portions 164 and 166 are constructed such that they fully support the force acting on the rotating drum 40. Generally, to mount the shaft portions 160 of the rotating drum 40 detachably in the receiving portions 164 and 166, it is necessary to adjust the angle of contact between each portion 160 and the receiving portion 164 or 166 to be not more than 180 degree. On the other hand, if the angle of contact is maintained relatively low, it is difficult to support the shaft portions 160 sufficiently accurately. In the illustrated embodiment, by employing the structure shown in FIG. 7, the shaft portions 160 can be accurately supported despite the fact that the angle of contact between each shaft portion 160 and the receiving portions 164 or 166 is not more than 180 degrees. Specifically, a gear 180 provided in the rotating drum 40 is meshed with a driving gear 182 provided in the main body 2 of the machine as shown in FIG. 7. When the driving gear 182 rotates in the direction shown by an arrow 184, the direction of an acting force F on the rotating drum 40 is displaced by an angle of $90+\alpha$ which is the sum of 90 degrees displaced clockwise from an axis line P connecting the center of rotation of the driving gear 182 and the center of rotation of the rotating drum 40 and a pressure angle $\alpha$ of the gear 180. If the pressure angle $\alpha$ is 20 degrees, this direction is as shown in FIG. 7. On the other hand, in the illustrated embodiment, the receiving portions 164 and 166 extend clockwise in an arcuate shape from right bottom in the horizontal direction to left top in the horizontal direction and make contact with the bearing members 162 to support the rotating drum 40, as shown in FIG. 7. Accordingly, the arcuate parts of the receiving portions 164 and 166 extend further upwardly beyond the acting direction of the acting force F, and the acting force F exerted on the rotating drum 40 via the driving gear 182 and the gear 180 is transmitted to the end walls 128 and 130 via the bearing members 162 and the receiving portions 164 and 166. Consequently, the receiving portions 164 and 166 accurately support the shaft portions 160.

The developing device 46 is mounted on the unit frame 38 in the following manner. Again, with reference to FIGS. 3 to 5, the illustrated developing device 46 includes a main body 188 having a lower housing 190 and an upper housing 192. An opening is defined in the lower part of the left surface (that surface which faces the rotating drum 40) of the main body 188 of the developing device, and a magnetic brush mechanism 194 is disposed in the opening. The magnetic brush mechanism 194 is comprised of a hollow sleeve 198 to be rotated in the direction shown by an arrow 196 and a stationary permanent magnet 200 disposed within the hollow sleeve 198, and holds a developer composed of a toner magnetically and applies it to the surface of the photosensitive material on the rotating drum 40. A doctor blade 202 which may be formed of, for example, a thin plastic film is disposed in the opening. The doctor blade 202 extends downwardly from a securing member 204 fixed to the upper housing 192 and its free end portion is kept in pressing contact with the peripheral surface of the hollow sleeve 198. The doctor blade 202 acts to remove excess developer from the magnetic brush mechanism 194. toner is held in a toner holding chamber 206 defined by the lower housing 190, the upper housing 192 and the doctor blade 202, and an agitating feed roller 208 is disposed at the bottom of the toner holding chamber 206. The agitating feed roller 208 is rotated in the direction shown by an arrow 210 and mixes toner in the toner holding chamber 206 with a toner which is recovered in toner recovery chamber 134 and fed into the toner holding chamber 206 by the action of a toner transfer means (to be described) by agitation, and feeds the mixed toner to the magnetic brush mechanism 194. Supporting pins 216 (only one of which is shown in FIGS. 4 and 6) are fixed to the left upper parts of walls 212 and 214, and by attaching the supporting pins 216 pivotally to the inside surfaces of the end walls 128 and 130 of the unit frame 38, the developing device 46 is mounted on the unit frame 38. Pins 218 are fixed to the lower parts of the outside surfaces of the end walls 212 and 214 in the main body 188 of the developing device, and corresponding to these pins 218, pins 220 are fixed to the outside surfaces of the end walls 128 and 130 in the unit frame 38. Biasing coil springs 222 (one of them is shown in FIG. 5, and the other, in FIGS. 4 and 6) are interposed between the pins 218 and pins 220 respectively. Thus, when the rotating drum 40 is detached from the unit frame 38, the developing device 46 is held at an angular position shown partly by two-dot chain lines in FIG. 6 by the contraction of the biasing coil springs 222. On the other hand, when the rotating drum 40 is detachably mounted on the unit frame 38, both end parts of its cylindrical portion 158 acts on a roll 224 (FIG. 7) mounted rotatably on the shaft portion of the hollow sleeve 198 in the magnetic brush mechanism 194 to pivot the developing device 46 slightly counterclockwise against the biasing force of the biasing coil springs 222. As a result, the developing device 46 is held at the angular position shown in FIG. 4 and by solid lines in FIG. 6. In this state, the developing device 46 is elastically biased in a direction approaching the rotating drum 40 with the supporting pins 216 as a center. Hence, the distance between the peripheral surface of the cylindrical portion 158 of the rotating drum 40 and the peripheral surface of the hollow sleeve 198 is adjusted to a fixed value determined by the roll 224.

The cleaning device 50 is mounted on the unit frame 38 in the following manner. With reference to FIGS. 4 and 6, an elastic blade 226 constituting a toner removing means 142 is mounted on the second frame member 126. In the illustrated embodiment, linking portions 230 (only one of which is shown in FIGS. 4 and 6) provided at both ends of a swinging support member 228 are pivotally linked to the end walls 128 and 130 of the first frame member 124 via linking pins 148. A blade securing member 232 is fixed to the swinging support member 228, and the elastic blade 226 is fixed to the free end of the blade securing member 232 by an adhesive or otherwise. On the swinging support member 228, a pair of upper protrusions 234 (only one of which is shown in the drawings) spaced from each other in a direction perpendicular to the sheet surface in FIGS. 4 and 6 are provided integrally. A biasing coil spring 238 is interposed between each of the upper protrusions 234 and a linking wall 236 connected between the end walls 136 and 138 of the second frame member 126. The biasing coil spring 238 bias the swinging support member 228, and therefore the elastic blade 226, clockwise in FIGS.

4 and 6 about the linking pin 148 as a center. Suspending pieces 240 which can abut with the upper protrusions are provided at predetermined sites on the inner surface of the upper wall 140 of the second frame member 126. With this arrangement, the swinging support member 228 can pivot relative to the second frame member 126 between an angular position at which its left end abuts with the linking wall 236 and an angular position at which the upper protrusions abut with the suspending pieces 240 of the upper wall 140 in FIGS. 4 and 6. Usually, the swinging support member 228 is held by the action of the biasing coil springs 238 at the angular position at which the upper protrusions 234 abut with the suspending pieces 240. On the other hand, the toner recovery chamber 134 for recovering the toner removed from the rotating drum 40 is defined between the inner walls 172 and 174 of the first frame member 124. With reference to FIG. 5 also, a nearly arcuate curved linking wall 242 is provided between the inner walls 172 and 174, and the toner recovery chamber 134 is defined by the inner surface of the linking wall 242. A film-like sealing member 244 extending toward the rotating drum 40 is provided at one end (upper end) of the linking wall 242, and a film-like sealing member 246 extending toward the rotating drum 40 and contacting or approaching the peripheral surface of the drum 40 is provided, at the other end portion (lower end portion) of wall 242. When the second frame member 126 is held at the operative position, the sealing member 244 makes contact with the under surface of the elastic blade 226 and seals the space between the linking wall 242 and the elastic blade 226. The sealing member 246 prevents falling of the toner through the space between the rotating drum 40 and the linking wall 242, and conducts the toner removed from the rotating drum 40 to the toner recovery chamber 134. In the illustrated embodiment, a helical toner transfer member 248 extends from the toner recovery chamber 134 to the toner holding chamber 206 of the developing device 46, and feeds the toner recovered in the toner recovery chamber 134 to the toner holding chamber 206 through a hollow cylindrical member 250 (see FIG. 3 also). With this structure, when the second frame member 126 is pivoted in the opening direction shown by arrow 146 (FIG. 6), the upper protrusions 234 of the swinging support member 228 abut with the suspending pieces 240 of the upper wall 140. As a result, the swinging support member 228 is likewise pivoted, and the elastic blade 226 moves in a direction away from the rotating drum 40 and leaves the surface of the photosensitive material by a relatively substantial spacing (see FIG. 6). When the second frame member 126 is pivoted in the closing direction shown by arrow 144 (FIG. 6) and held at the operative position, the forward end portion of the elastic blade 226 acts on the surface of the photosensitive material on the rotating drum 40 and is kept in pressing contact therewith at a predetermined pressure by the biasing force of the biasing coil springs 238. In this press-contacting state, the biasing coil springs 238 are slightly contracted by the abutment of the elastic blade 226 with the surface of the photosensitive material, and the upper protrusions 234 of the swinging support member 228 are spaced from the suspending pieces 240 of the upper wall 140, as shown in FIG. 4.

The mounting and detaching operations of the rotating drum 40 in the above process unit 36 will be described.

With reference to FIGS. 4 and 6, the operation of detaching the rotating drum 40 starts with the detachment of the process unit 36 from the main body 2 of the machine in the manner to be described and the placing of the detached process unit 36 on the surface S (FIG. 6) such as a table surface.

Then, the elastically deformable portion 154 of the second frame member 126 is slightly deformed elastically and the engagement between the protruding portion 152 of the first frame member 124 with the receiving portion 156 defined in the elastically deformable portion 154 is cancelled. The second frame member 126 is pivoted in the opening direction shown by arrow 146 and brought to the position shown in FIG. 6 (held at this position by the abutment of the left end of the second frame member 126 with the surface S. As a result, the swinging support member 228 pivots likewise, and the elastic blade 226 moves in a direction away from the rotating drum 40, whereby the elastic blade 226 comes out of contact with the photosensitive material of the rotating drum 40. Furthermore, the second frame member 126 moves substantially to the left of the first frame member 124 whereby the top of the rotating drum 40, the top of the left portions of the end walls 128 and 130 (the second guide portion 170) and the top of the inside walls 172 and 174 (the first guide portion 168) are open to view, and the first guide portion 168 and the second guide portion 170 are exposed to the exterior.

Then, the rotating drum 40 is lifted and the bearing members 162 are detached from the receiving portions 164 and 166 defined in the end walls 128 and 130. The rotating drum 40 can thus be detached easily without injuring the photosensitive material on its surface because its top is relatively greatly open to view and the elastic blade 226 is spaced from the rotating drum 40.

To mount the rotating drum 40 after detachment thereof in the above manner (mount the detached rotating drum 40 again, or mount a new rotating drum 40 in place of the detached rotating drum 40), both end portions of its cylindrical portion 158 are positioned from above onto the first guide portion 168, and moved as shown by the two-dot chain lines in FIG. 6 along the first guide portion 168. Then, the bearing members 162 on the shaft portions 160 are positioned on the second guide portion 170 as shown by the broken lines in FIG. 6 and slightly moved along it, and then allowed to fall into the receiving portions 164 and 166. As a result, the shaft portions 160 of the rotating drum 40 are detachably received by the receiving portions 164 and 166. At such time, the rotating drum 40 also can be easily mounted without injuring the photosensitive material because the elastic blade 226 is in a retracted position. Furthermore, it is sufficient at the time of mounting to move the cylindrical portion 158 of the rotating drum 40 along the first guide portion 168 and then to move the bearing members 162 of shaft portions 160 along the second guide portion 170. Thus, the rotating drum 40 can be mounted easily without injuring the photosensitive material.

When thereafter the second frame member 126 is pivoted in the closing direction shown by arrow 144 and held at the operative position shown in FIG. 4, the protruding portion 152 of the upper wall 132 is received in the receiving portion 156 of the elastically deformable portion 154 and thus the second frame member 126 is held at the operative position. In this state, the forward end portion of the elastic blade 226 is brought into pressing contact with the surface of the photosensitive material in the rotating drum 40 by the action of the biasing coil spring 238, and the toner on the photosensitive material of the rotating drum 40 is removed by the action of the elastic blade 226. Furthermore, in this state, the movement of the bearing members 162 mounted on the rotating drum 40 in a downward direction and a crosswise direction (the left-right direction in FIG. 4) is restrained by the receiving portions 164 and 166. The lower edges of the end walls 136 and 138 of the second frame member 126 held at the operative position abut with the upper edges of the bearing members 162 mounted on the rotating drum 40 to restrain upward movement of the bearing members 162 and support the rotating drum 40 accurately on the unit frame 38.

Modified Embodiment of the Process Unit

In the above illustrated embodiment, the second frame member is adapted to be releasably locked at the operative position. If desired, it is also possible to construct the second frame member such that it can also be releasably locked at a non-operative position displaced slightly in the opening direction from the operative position.

Figure 8:
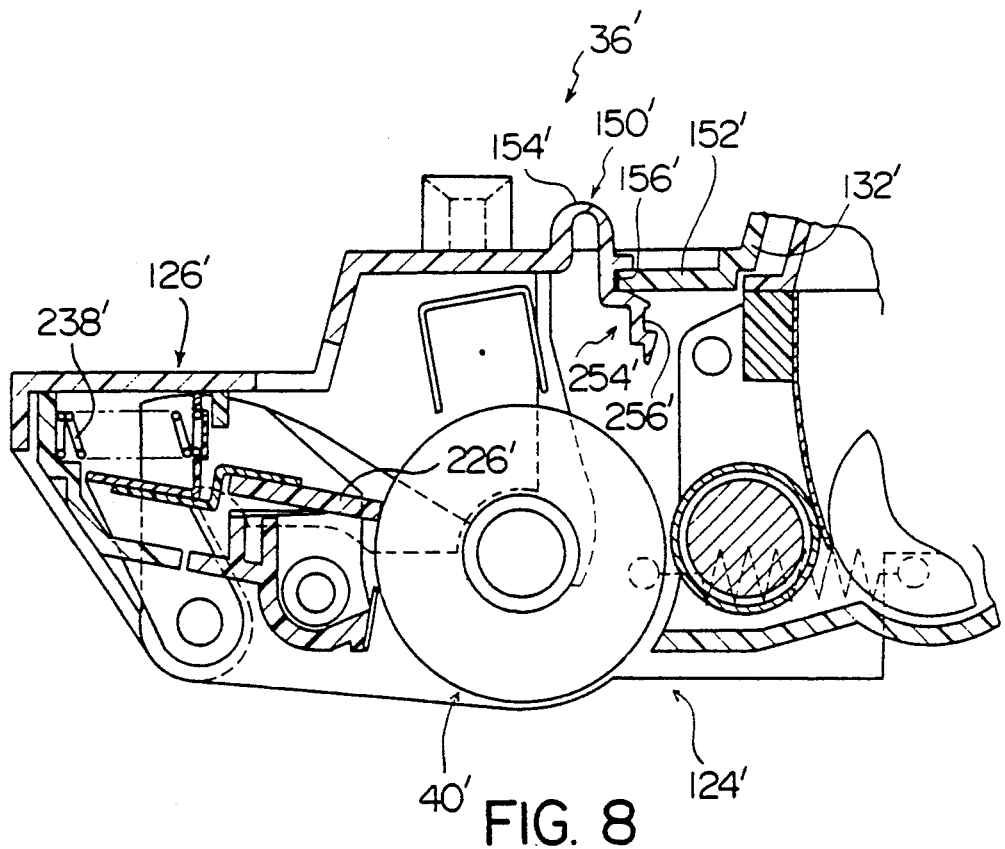
FIG. 8 is a partial sectional view showing a modified example of the process unit in which a second frame member is at an operative position.
Figure 9:
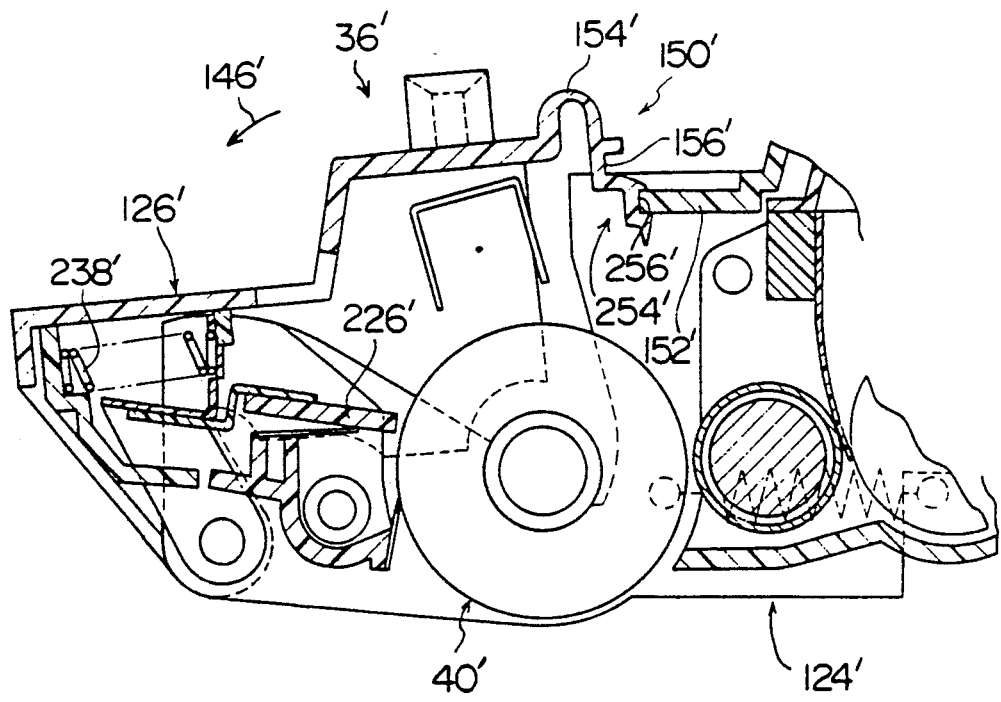
FIG. 9 is a partial sectional view showing the process unit of FIG. 8 in a state in which the second frame member is held in a non-operative position.

With reference to FIGS. 8 and 9 showing such a modified embodiment of the process unit, a non-operative position locking means 254' is provided in addition to the operative position locking means 150'. The operative position locking means 150' is provided with a receiving portion 156' defined in the elastic deformable portion 154' of the second frame member 126', and by holding the second frame member 126' at the operative position shown in FIG. 8, the protruding portion 152' provided in the upper wall 132' of the first frame member 124' is received detachably in the receiving portion 156'. When the second frame member 126'is held at the operative position, the elastic blade 226' acts on the surface of the photosensitive material on the rotating drum 40', and its forward end portion is brought into pressing contact with the surface of the photosensitive material by the action of the biasing coil spring 238'.

The non-operative position locking means 254' is provided with a receiving portion 256' defined in the forward end portion of the elastically deformable portion 154' (further forwardly of the site at which the receiving portion 156' is defined), and by pivoting the second frame member 126' slightly in the opening direction shown by arrow 146' from the operative position, the protruding portion 152' of the first frame member 124' is detached from the receiving portion 156' and received detachably in the receiving portion 256', as shown in FIG. 9. As a result, the non-operative position locking means 254' is in the locking state, and the second frame member 126' is held at the non-operative position shown in FIG. 9. In this state, the elastic blade 226' moves in a direction away from the rotating drum 40' and its forward end portion does not substantially act on the surface of the photosensitive material but is slightly spaced therefrom because surface because the second frame member 126' is slightly pivoted in the opening direction.

With this process unit 36' of the modified embodiment, the same effect as above can be achieved. In addition, by holding the second frame member 126' at the non-operative position during conveying, storage, etc. of the process unit 36', the pressing contact of the elastic blade 226' against the photosensitive material on the rotating drum 40' can be cancelled. As a result, degradation of the photosensitive material and deformation of the elastic blade 256' can be prevented.

In place of the above structure, the operative position locking means 150' and the non-operative position locking means 254' may be provided separately for respective exclusive use.

Optical Unit and Manner of Mounting

Figure 10:
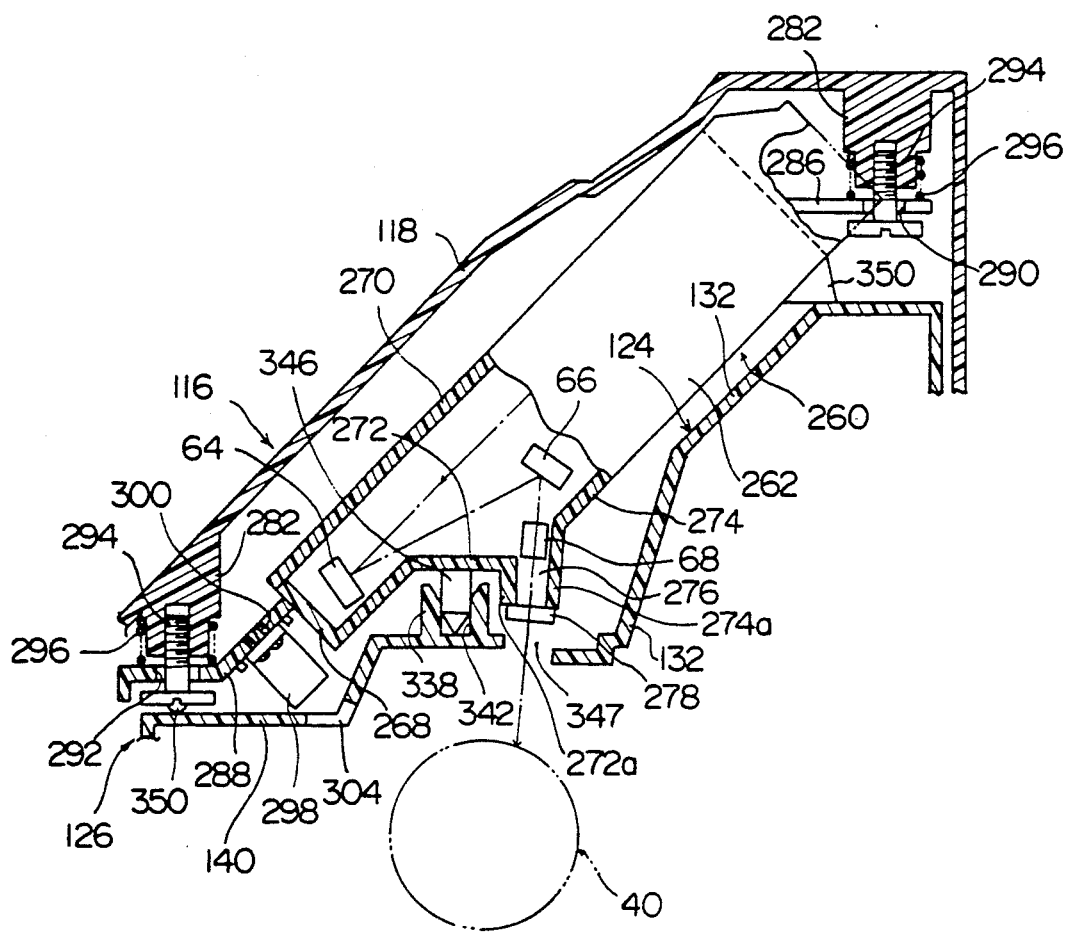
FIG. 10 is a sectional view showing an optical unit and its vicinity in the laser beam printer of FIG. 1.
Figure 11:
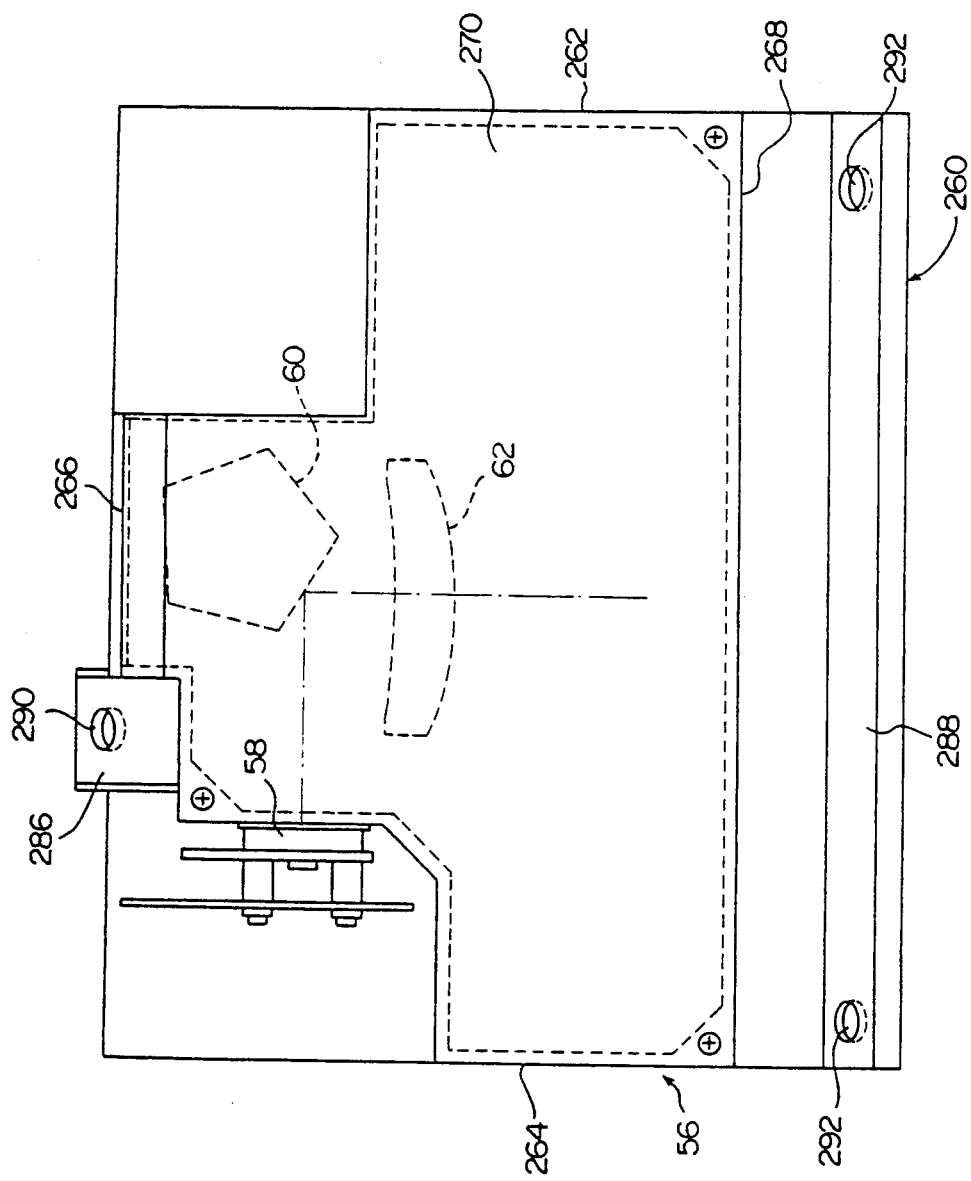
FIG. 11 is a top plan view showing the optical unit in the laser beam printer of FIG. 1.

With reference to FIGS. 10 and 11 as well as FIG. 3, the optical unit 56 will be described in detail. The optical Unit 56 is provided with a boxlike optical unit frame 260, and the optical means 69 is disposed within the optical unit frame 260. The optical unit frame 260 is composed of various walls 262, 264, 266, 268, 270, 272 and 274 to define a substantially sealed space. The laser beam source 58 is mounted on the wall 264, and the rotating polygon mirror 60, the fθ lens 62, the first reflecting mirror 64, the second reflecting mirror 66 and the cylindrical lens 68 are mounted on the optical unit frame 260. Specifically, parts 272a and 274a of the walls 272 and 274 project downwardly, and an elongate rectangular projecting opening 276 is defined thereby. The opening 276 is covered with a transparent glass sheet 278, and a laser beam from the laser beam source 58 is projected onto the surface of the photosensitive material of the rotating drum 40 through the transparent glass sheet 278.

Figure 12:
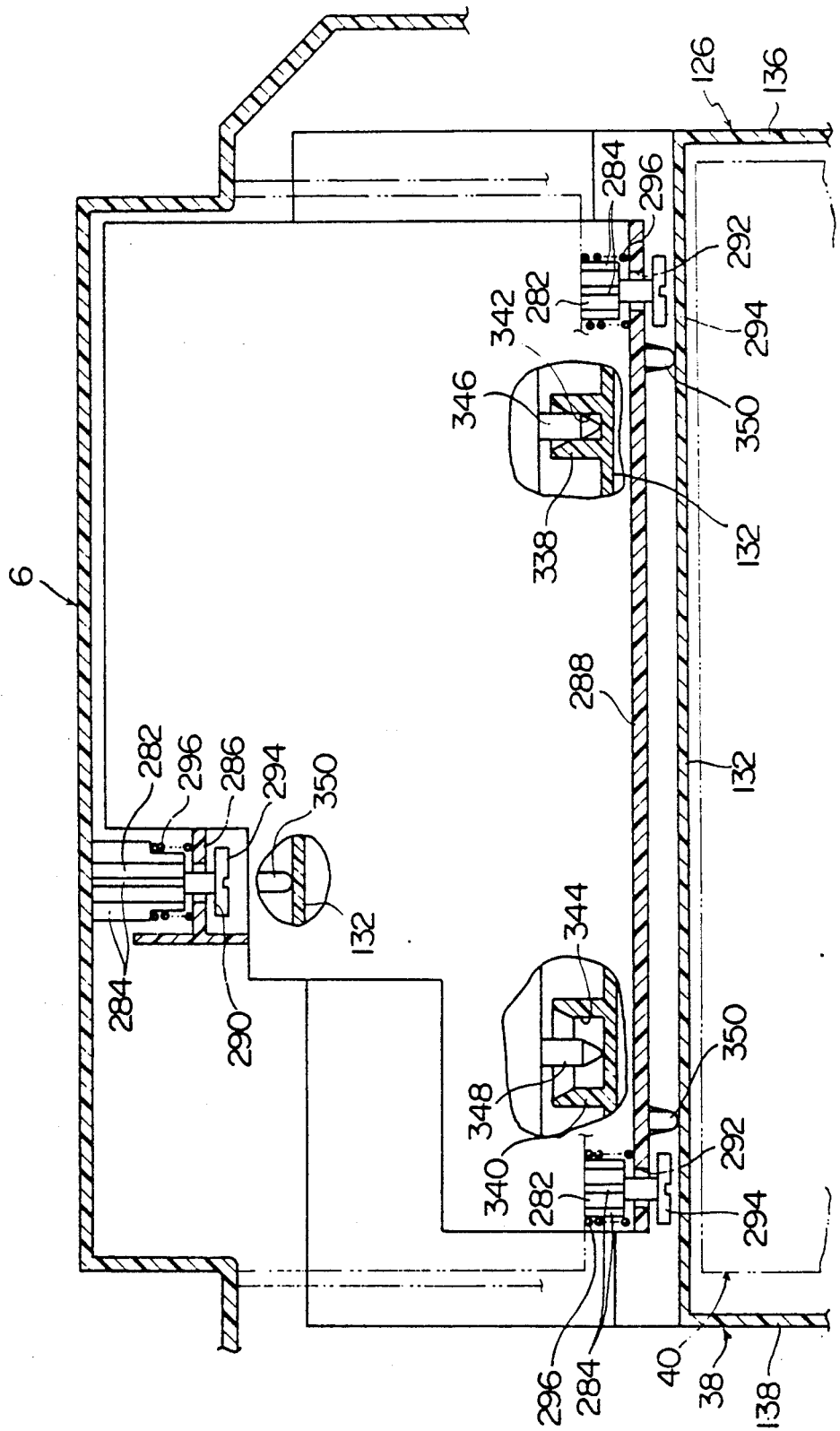
FIG. 12 is a sectional view illustrating the positional relationship between the optical unit and the process unit in the laser beam printer of FIG. 1.

The optical unit frame 260 is mounted on the inner surface of the upwardly inclined wall 118 of the housing 6 in the following manner. With reference also to FIG. 12, three inwardly projecting boss portions 282 are formed integrally on the inner surface of the upwardly inclined wall 118 of the housing 6 in the illustrated embodiment. As can be seen from FIG. 12, one boss portion 282 is formed on the right end portion, as viewed in FIG. 10, of the upper wall 282, and two boss portions 282 are formed in the left end portion as viewed in FIG. 10 of the upwardly inclined wall 118 (the boss portions are spaced from each other in a direction perpendicular to the sheet surface in FIG. 10). Internally threaded holes are formed in these boss portions 282. Four protrude 284 protruding outwardly from the peripheral surface of each boss portion 282, and a stepped part is provided in each of the protrusions 284. On the other hand, outwardly projecting supporting portions 286 and 288 are formed integrally on the walls 266 and 268 of the optical unit frame 260. One hole 290 corresponding to the boss portion 282 is formed in one supporting projecting portion 286, and two holes 292 corresponding to the two boss portions 282 are formed in the other supporting projecting portion 288. As shown in FIGS. 10 and 12, the optical unit frame 260 is mounted on the inner surface of the upwardly inclined wall 118 by threadedly securing fixing screws 294 to the boss portions 282 of the upwardly inclined wall 118 throughout the holes 290 and 292 formed in the optical unit frame 260. In this mounted state, the optical unit frame 260 is free to move in the vertical direction in FIGS. 10 and 12, or in other words, in a direction moving toward and away from the process unit 36 between a position at which the supporting projecting portions 286 and 288 abut with the forward ends of the boss portions 282 and a position at which they abut with the head parts of the fixing screws 294 secured to the boss portions 282. Furthermore, in the illustrated embodiment, the outside diameter of the shaft portion of each fixing screw 294 is smaller than the inside diameter of the hole 290 or 292 formed in the optical unit frame 260. Hence, the optical unit frame 260 can move in the left-right direction in FIG. 10 (the direction perpendicular to the sheet surface in FIG. 12) and in a direction perpendicular to the sheet surface in FIG. 10 (the left-right direction in FIG. 12), or in other words in a horizontal direction substantially parallel to the process unit 36, within a range in which the shaft portions of the fixing screws 294 can move within the corresponding holes 290 and 292. Biasing coil springs 296 constituting biasing means are also provided in the optical unit frame 260. The biasing coil springs 296 are fitted over the boss portions 282 and interposed between the stepped parts of the protrusions 284 and the supporting projecting portions 286 and 288. These biasing coil springs 296 elastically bias the optical unit frame 260 downwardly in FIGS. 10 and 12, or in other words, in a direction approaching the process unit 36. Thus, the optical unit frame 260 is usually (for example, when the housing 6 is held at the open position) held at a predetermined position by the abutting of the supporting projecting portions 286 and 288 with the head parts of the fixing screws 294.

In the illustrated embodiment, a charge eliminating lamp (not shown) is mounted on the optical unit frame 260. With reference mainly to FIG. 10, a lamp housing 298 is mounted by fixing screws 300 to the under surface of the supporting protruding portion 288 of the optical unit frame 260, and the charge eliminating lamp is disposed in the lamp housing 298. The charge eliminating lamp illuminates the rotating drum 40 through a charge eliminating opening 304 (FIGS. 10 and 13) formed in the upper wall 140 of the second frame member 126 in the process unit 36 to erase the residual charge on the photosensitive material.

Manner of Mounting the Process Unit

The process unit 36 is mounted detachably on the lower section 4 of the main body 2 of the machine in the following manner.

Figure 13:
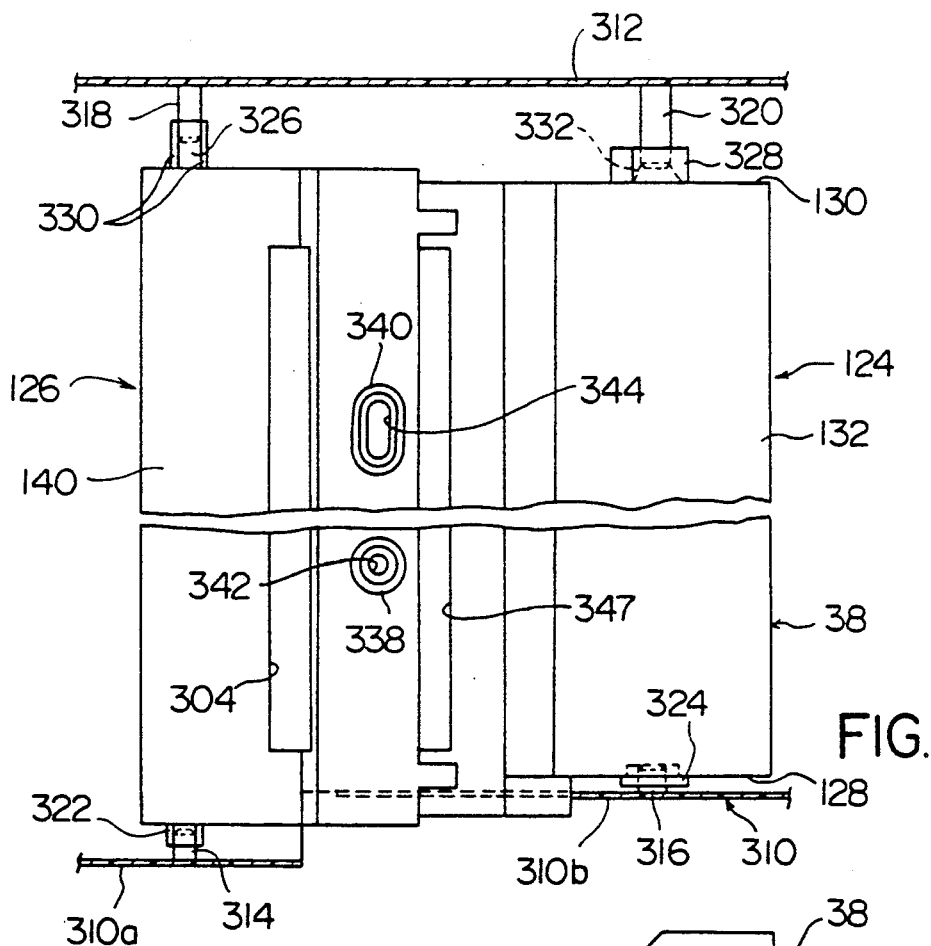
FIG. 13 is a sectional view of the process unit and its vicinity, as viewed from above, in the laser beam printer of FIG. 1.
Figure 14:
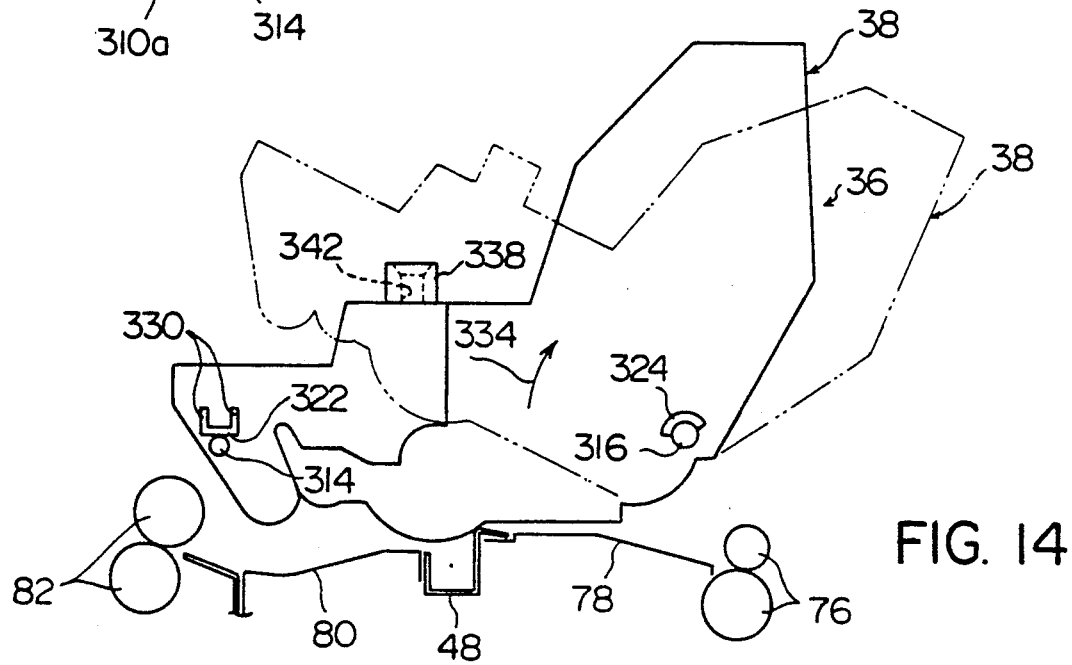
FIG. 14 is a simplified view illustrating the manner of mounting the process unit.

With reference to FIGS. 13 and 14, a pair of vertical base plates 310 and 312 are disposed in spaced-apart relationship in the aforesaid crosswise direction in the lower section 4 of the main body. The vertical base plate 310 is divided in the front-rear direction (the left-right direction in FIG. 13), and an inwardly projecting supporting pin 314 is provided on the inner surface of one plate portion 310a. An inwardly projecting supporting pin 316 is also provided on the inner surface of another plate portion 310b. A pair of supporting pins 318 and 320 projecting inwardly and spaced from each other in the front-rear direction are provided on the inside inner surface of the vertical base plate 312. A projecting support portion 322 corresponding to the supporting pin 314 is provided on the outer surface of the end wall 136 of the second frame member 126 of the process unit 36, and a projecting support portion 326 corresponding to supporting pin 318 is provided on the outer surface of the other end wall 138. A projecting support portion 324 corresponding to the supporting pin 316 is provided on the outer surface of the end wall 128 of the first frame member 124 of the process unit 36, and a projecting support portion 328 corresponding to the supporting pin 320 is provided on the outer surface of the other end wall 130. The under surfaces of the projecting support portions 322 and 326 are substantially flat, and a pair of upwardly projecting knob protrusions 330 are provided on the upper surface of each of these projection support portions. Arcuate receiving portions are defined in the under surfaces of the projecting support portions 324 and 328. With this construction, the unit frame 38 is detachably mounted across the vertical base plates 310 and 312 by placing it on the supporting pins 314, 316, 318, and 320 from above, or more specifically, positioning the receiving portions defined in the projecting support portions 324 and 328 (at one end portion of the unit frame 38) on the supporting pins 316 and 320 (constituting one supporting means) and at the same time, positioning the projecting support portions 322 and 326 at the other end portion on the supporting pins 314 and 318 (constituting the other supporting means). In this mounted state, the movement of the unit frame 38 in the left-right direction in FIGS. 13 and 14 with respect to the vertical base plates 310 and 312 is accurately restrained because the cylindrical supporting pins 316 and 320 are positioned in the arcuate receiving portions of the projecting support portions 324 and 328. Furthermore, in the illustrated embodiment, an elastic piece 332 such as a plate spring is provided at that site of the first frame member 124 of the unit frame 38 on which acts the tip of the supporting pin 320. Accordingly, in the above mounted state, the elastic piece 332 acts on the unit frame 38 to bias it elastically downwardly. The tip of the supporting pin 316 abuts with the end wall 128 of the first frame member 124, and the unit frame 38 is held at the position shown by solid lines in FIG. 16. Furthermore, in this mounted state, the unit frame 38 is free to pivot about the supporting pins 316 and 320 (constituting an axis of the center of pivoting) as a center. Hence, by holding the knob portions 330 of the projecting support portions 332 and/or 326 and lifting them, the unit frame 38 can be pivoted in the direction shown by an arrow 334 to the position shown by two-dot chain lines in FIG. 14.

Positioning of the Optical Unit with respect to the Process Unit

A positioning means and a rotation hampering means are provided to maintain the process unit 36 and the optical unit 56 at a predetermined positional relationship. With reference to FIGS. 10, 12 and 13, the illustrated positioning means is comprised of a combination of a positioning projection and a receiving portion for detachably receiving the positioning projection. In the illustrated embodiment, the positioning projection is comprised of a cylindrical positioning pin 346 provided integrally in the under surface of the wall 272 of the optical unit frame 260, and the receiving portion is comprised of a receiving hole 342 defined by a circular protrusion 338 provided integrally on the upper surface of the upper wall 140 of the second frame member 126 in the process unit 36. By providing the positioning pin 346 and the circular protrusion 338 defining the receiving hole 342 integrally in the optical unit frame 260 and the second frame member 126, the positioning to be described of the optical unit frame 260 and the process unit frame 38 can be effected accurately. The receiving hole 342 is of a circular shape having an inside diameter corresponding to the outside diameter of the positioning pin 346. When the opening-closing housing 6 is held at the closed position as will be described below, the positioning pin 346 is positioned in place in the receiving hole 342. As a result, that site of the process unit frame 38 at which the receiving hole 342 is provided is kept substantially in alignment in the vertical direction with that site of the optical unit frame 260 at which the positioning pin 346 is provided. To facilitate positioning of the positioning pin 346 in the receiving hole 342, it is preferred to taper the tip portion of the positioning pin 346 and to incline the opening part of the receiving hole 342 downwardly inwardly. Preferably, the receiving hole 342 defining the receiving portion is provided in the neighborhood of an exposure opening 347 defined between the upper wall 132 of the first frame member 124 and the upper wall 140 of the second frame member 126 as shown in FIG. 13. This arrangement enables the projecting opening 276 in the optical unit 56 and the exposure opening 347 to be maintained at a predetermined positional relationship more accurately.

The rotation hampering means is comprised of a rotation hampering protrusion and a receiving portion for detachably receiving the rotation hampering protrusion. In the illustrated embodiment, the rotation hampering protrusion is comprised of a cylindrical rotation hampering pin 348 integrally provided in the under surface of the wall 272 of the optical unit frame 260, and the receiving portion is comprised of an elongate receiving hole 344 defined in a protrusion 340 formed integrally on the upper surface of the upper wall 140 of the second frame member 126 in the process unit 36. The receiving hole 344 has a width corresponding to the outside diameter of the rotation hampering pin 348, and extends in a direction substantially perpendicular to the axis of the center of pivoting of the housing 6 (left-right direction in FIG. 12). When the housing 6 is held at the closed position in the manner to be described, the rotation hampering pin 348 is positioned in place in the elongate receiving hole 344. As a result, relative pivoting movement of the process unit frame 38 and the optical unit frame 260 about the positioning pin 346 as a center can be accurately hampered. To facilitate the positioning of the rotation hampering pin 348 in the receiving hole 344, it is preferred as shown in FIG. 12 to taper the tip portion of the rotation hampering pin 348 and at the same time incline the opening portion of the receiving hole 344 downwardly inwardly.

With regard to the positioning means, it is possible to provide the positioning protrusion on the process unit frame 38 and the receiving portion in the optical unit frame 260 contrary to the above-described arrangement. Furthermore, with regard to the rotation hampering means, it is also possible to provide the rotation hampering protrusion on the process unit frame 38 and the receiving portion in the optical unit frame 260 contrary to the above arrangement.

In the illustrated embodiment, three actuating pieces 350 are provided on the optical unit frame 260 in order to maintain a predetermined vertical distance between the process unit frame 38 and the optical unit frame 260. One actuating piece 350 is nearly triangular, and is provided at the end portion of the wall 274. It acts on the right end portion in FIG. 10 of the upper wall 132 of the first frame member 124. The other two actuating pieces 350 are cylindrical pins and are provided on the supporting projection 288 in spaced-apart relationship in the lateral direction (the left-right direction in FIG. 12 and in a direction perpendicular to the sheet surface in FIG. 10). They act on the left end portion in FIG. 10 of the upper wall 140 of the second frame member 126. With this construction, when the housing 6 is held at the closed position in the manner to be described, the actuating pieces 350 act on the process unit 36, and the distance between the process unit frame 38 and the optical unit frame 260 is maintained at a predetermined value by the action of these actuating pieces 350. By providing these actuating pieces 350 integrally in the optical unit frame 260, the distance between the optical unit frame 260 and the process unit frame 38 can be accurately maintained at a desired value.

Mounting and Detaching Operations of the Process Unit

With reference mainly to FIGS. 2 and 3, the operations of mounting and detaching the process unit 36 will be described.

To detach the process unit 36, the opening-closing housing 6 is first opened. Specifically, the locking means 28 is released, and the housing 6 is pivoted in the direction of arrow 35. When the engaging member 30 in the locking means 28 is held at the non-locking position shown by the two-dot chain lines in FIG. 2, the engaging member 30 is disengaged from the engaging opening 34 formed in the lower section 4 of the main body. When the housing 6 is lifted thereafter, the housing 6 pivots in the direction of arrow 35 about the supporting shaft 14 as a center and is held at the open position shown by the two-dot chain lines in FIG. 2. When the housing 6 is held at the open position, the top of the process unit 36 is open to view. Consequently, part of the conveying passage is opened, and the process unit 36 is in condition for detachment.

With reference to FIGS. 13 and 14, part of the conveying passage (specifically that part of the conveying passage which is below the rotating drum 40) is opened by holding the knob portions 330 of the support portions 322 (and/or 326) provided in the unit frame 38 and lifting them. As a result, the unit frame 38 is pivoted in the direction of arrow 334 (FIG. 14) about the supporting pins 316 and 320 as a center. For example, by pivoting the unit frame 38 to the position shown by the two-dot chain lines in FIG. 14, part of the conveying passage is opened as is required. Thus, should a sheet material be jammmed in the above part of the conveying passage, especially in a region from a site below the rotating drum 40 to the fixing roller pair 82, the sheet material can be easily removed by opening the conveying passage as described above.

To detach the process unit 36, the unit frame 38 is taken out through the space formed by holding the housing 6 in the open position. When the unit frame 38 is lifted, the support portions 322, 324, 326 and 328 are detached respectively from the supporting pins 314, 316, 318 and 320, and the gear 180 is disconnected from the driving gear 182 (FIG. 7). As a result, the process unit 36 can be detached as is required.

On the other hand, to mount the process unit 36, the unit frame 38 is positioned on the supporting pins 314, 316, 318 and 320 through the aforesaid space while the housing 6 is held at the open position. Consequently, as shown in FIG. 13 and by the solid lines in FIG. 14, the support portions 322, 324, 326 and 328 provided in the unit frame 38 are positioned respectively on the corresponding supporting pins 314, 316, 318 and 320, whereby the process unit 36 is detachably mounted on the lower section 4 of the main body.

Thereafter, the housing 6 is pivoted in a direction opposite to the direction of arrow 35 from the open position and held at the closed position shown in FIGS. 1 and 3 and by the solid lines in FIG. 2. At the closed position, the engaging member 30 engages the engaging opening 34, and the housing 6 is held releasably at the closed position by the action of the locking means 28. When the housing 6 is held at the closed position, the positioning pin 346 and the rotation hampering pin 348 provided on the optical unit frame 260 are positioned in the receiving portion (the receiving hole 342) and the receiving portion (the receiving hole 344) defined in the unit frame 38 mounted across the vertical base plates 310 and 312 (FIG. 13) as shown in FIGS. 10 and 12. Since the outside diameter of the positioning pin 346 is substantially equal to the inside diameter of the receiving hole 342, the specific sites of the unit frame 38 and the optical unit frame 260 (in the illustrated embodiment, that site of the optical unit frame 260 which is near the projecting opening 276 and that site of the unit frame 38 which is near the exposure opening 347) are kept in alignment vertically with each other. Furthermore, since the outside diameter of the rotation hampering pin 348 is substantially equal to the width of the receiving portion (receiving hole 344, relative turning of the optical unit frame 260 about the positioning pin 346 as a center with respect to the unit frame 38 can be hampered. As a result, the optical unit 56 is positioned as is required above the process unit 36. The receiving portion 116 and the upper inclined wall 118 of the housing 6 are positioned above the optical unit 56, and the process unit 36 and the optical unit 56 are maintained accurately in a predetermined positional relationship via the positioning means and the rotation hampering means. When the opening-closing housing 6 is held at the closed position, the actuating pieces 350 formed on the optical unit frame 260 act on the upper surface of the unit frame 38 (one actuating piece 350 acting on the upper wall 132 of the first frame member 124, and two actuating pieces 350, on the upper wall 140 of the second frame member 126), and the optical unit frame 260 is slightly elevated against the biasing force of the biasing coil spring 296 with respect to the unit frame 38, as shown in FIGS. 10 and 12. Accordingly, the optical unit frame 260 is maintained at a predetermined distance from the unit frame 38 by the action of the actuating pieces 350 and elastically pressed and held by the action of the biasing coil spring 296. Thus, the vertical distance between the unit frame 38 and the optical unit frame 260 is accurately maintained at a predetermined value.

In an image-forming condition in which the opening-closing housing 6 is held at the closed position, the upwardly inclined wall 118 (defining the receiving portion 116) of the housing 6 extends upwardly at a first angle to the horizontal from left to right in FIGS. 3 and 10, that is, downstream in the discharging direction of the sheet material. In this regard, the optical unit frame 260 disposed in the inner wall of the upwardly inclined wall 118, also is inclined to the horizontal and extends substantially parallel to the upwardly inclined wall 118. In the optical unit frame 260, a laser beam from the laser beam source 58 is reflected by the rotating polygon mirror 60, and then is conducted downwards toward the left in FIG. 3 and downwardly in FIG. 11. It is reflected by the first reflecting mirror 64 and reaches the second reflecting mirror 66. Then, it passes through the transparent glass 278 and reaches the rotating drum 40. The longest straight-line portion of the light path of the optical means 69, i.e. the part from the rotating polygon mirror 60 to the first reflecting mirror 64 in the illustrated embodiment, extends substantially parallel along the optical unit frame 260 or in other words, the upwardly inclined wall 118, from right end portion of the optical unit 260 in FIGS. 3 and 10 to its left end portion in FIGS. 3 and 10. Accordingly, substantially no wasteful space exists between the upwardly inclined wall 118 of the housing 6 and the optical unit frame 260, and the machine as a whole can be reduced in size. Furthermore, since the main part of the optical path of the optical means 69 is inclined as above described to the horizontal, length in the left-right direction (horizontal) of the optical unit frame 260 in FIGS. 3 and 10 is reduced. While part of the machine has a slightly increased height, the size of the machine as a whole in the left-right direction in FIG. 3 can be greatly decreased. The first angle $\theta$ (FIG. 3) can be preset at about 45 degrees in view of the dischargeability of the sheet material received by the receiving portion 116 and the reduction in size of the machine as a whole.

Furthermore, since the main portion of the light path of the optical means 69 is so inclined, a relatively large space is produced on the right side of the rotating drum 40 in FIGS. 3 and 10. In this space, the developing device 46 is disposed as shown in FIG. 3, and the toner holding chamber 206 of the developing device 46 is spaced from the rotating drum 40 and is positioned outwardly of the magnetic brush mechanism 104. Hence, the space existing below the right end portion of the optical unit frame 260 in FIGS. 3 and 10 in which the toner holding chamber 206 exists is relatively high and sufficiently large despite the smaller size of the machine as a whole. By effectively utilizing this space as the toner holding chamber 206, such chamber 206 can hold an amount of toner sufficient for consumption until the life of the photosensitive material of the rotating drum 40 substantially comes to the end.

The above description has been directed mainly to the reduction of the space between the receiving portion 116 into which the sheet material is discharged and the optical means 69. To produce a relatively large space on one surface of the rotating drum 40, it is sufficient merely to incline the main part of the light path of the optical means 69. At this time, the inclination angle (to the horizontal) of the main part of the light path may be a second angle which differs from the first angle. By enlarging the second angle, a large space for the developing device 46 is produced. The second angle is preferably about 45 degrees which is the same as the first angle when the receiving portion 116 is provided substantially parallel to the main part of the light path in the optical means 69.

Modified Embodiments of the Laser Beam Printer

FIGS. 15 to 18 shows a first modified embodiment of the laser beam printer. In this first modified embodiment, the positioning means and the rotation hampering means are constructed as a common member.

Figure 15:
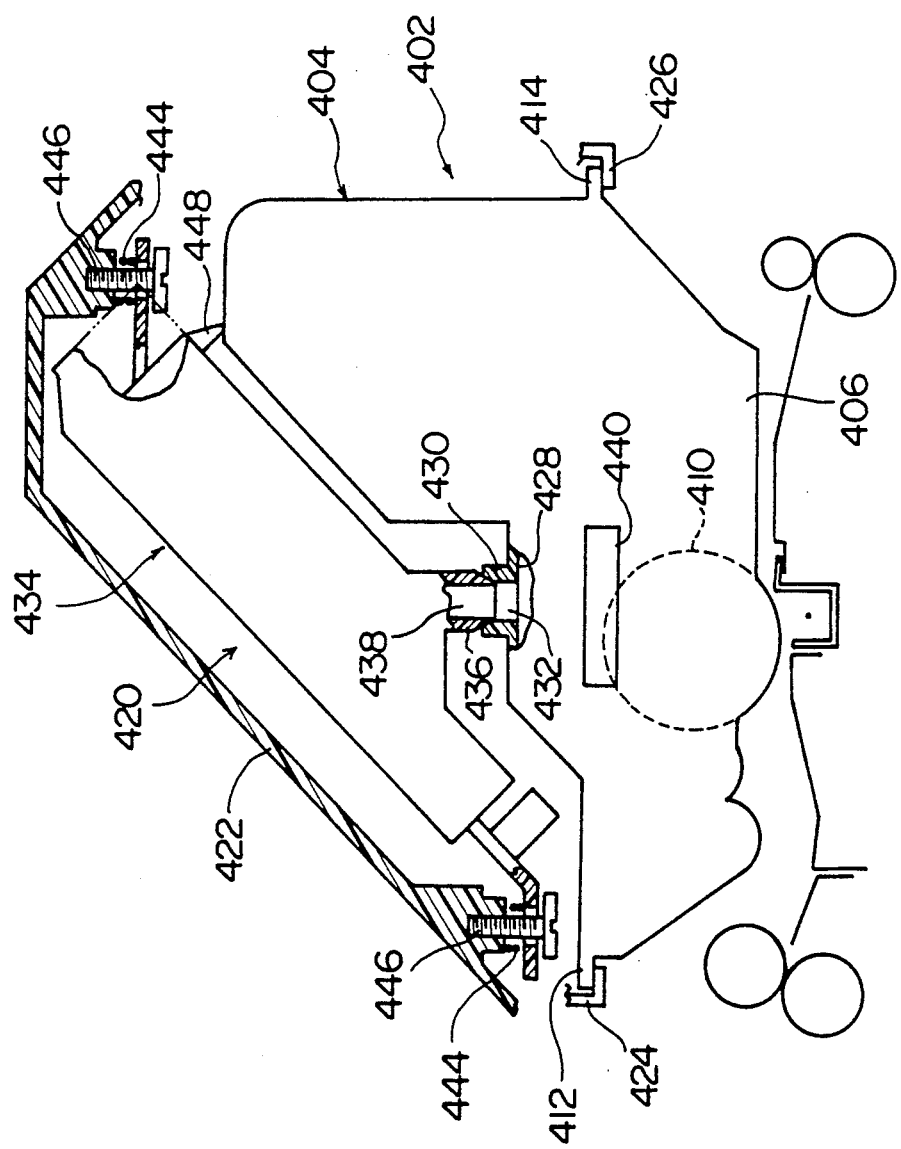
FIG. 15 is a sectional view illustrating in a simplified manner a process unit and an optical unit and vicinities thereof in a first modified embodiment of the laser beam printer.
Figure 16:
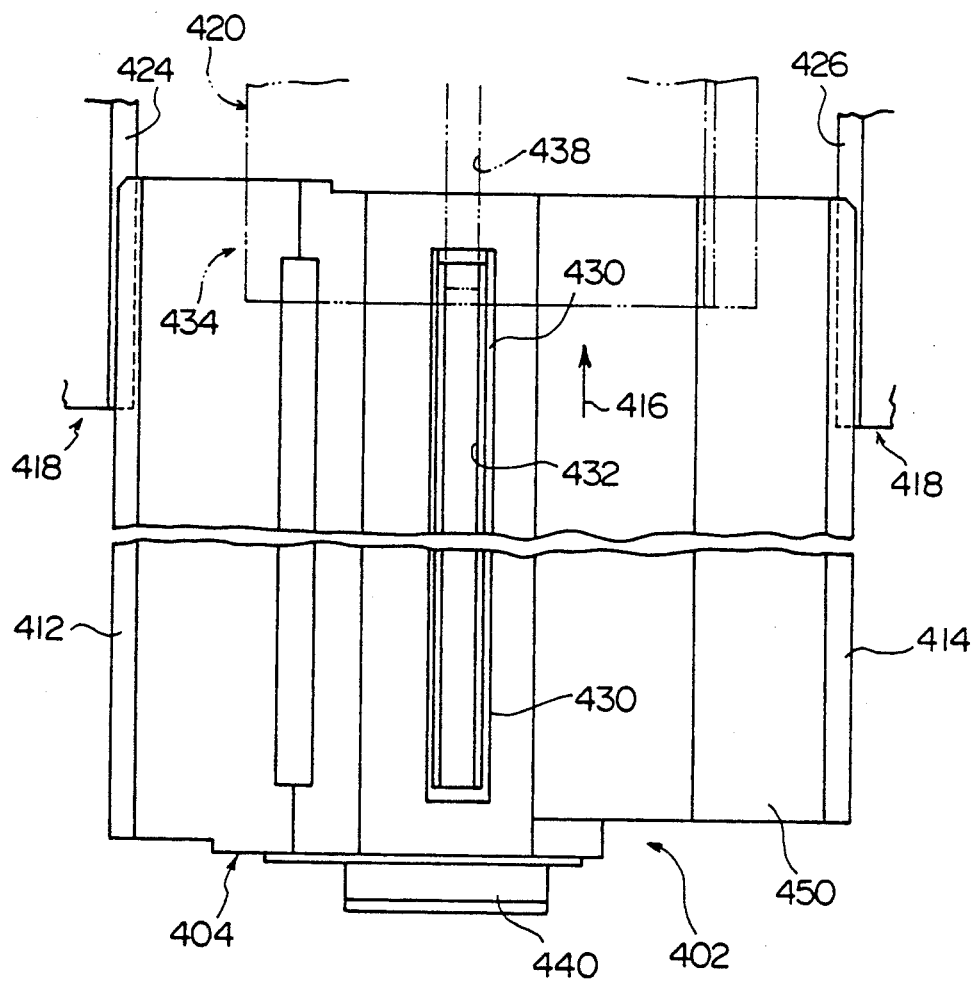
FIG. 16 is a top plan view illustrating the manner of mounting the process unit in the laser beam printer of FIG. 15.

With reference mainly to FIGS. 15 and 16, a process unit 402 in the first modified embodiment is provided with an ordinary one-piece process unit frame 404 to support rotating drum 410. A developing device (not shown) and a cleaning device (not shown) are mounted between a pair of end walls 406 and 408 of the unit frame 404 as in the embodiment described above. Projecting support portions 412 and 414 constituting a support means are provided at opposite side ends of the unit frame 404. The projecting support portions 412 and 414 project to the left and right in FIGS. 15 and 16, and are provided across the pair of end walls 406 and 408 in the mounting direction of the unit frame 404 shown by an arrow 416. On the other hand, a pair of supporting means spaced from each other in the left-right direction in FIGS. 15 and 16 are provided in the main body 418 of the machine (in the first modified embodiment, it is not constructed of a lower section and an opening-closing housing, and a wall 422 on which the optical unit 420 is mounted cannot be opened and closed). The pair of supporting means are comprised of nearly L-shaped supporting rails 424 and 426, and the projecting support portions 412 and 414 are supported on the supporting rails 424 and 426 in a manner to slide freely in the direction shown by arrow 416. Accordingly, the process unit 402 can be detachably mounted as described hereinafter on the main body 418 of the machine by opening an openable-closable cover member (not shown: the cover member provided on the right in FIGS. 1 and 2) which is present in front of the sheet surface in FIG. 15 (underside in FIG. 16) in the main body 418 of the machine.

In the first modified embodiment, an upwardly extending elongate rectangular projecting portion 430 is further provided in the upper wall 428 of the process unit frame 404, and an elongate rectangular exposure opening 432 is defined in the projecting portion 430. The opening part of the opening 432 (more specifically, parts defining both side edges of the opening 432) in the projecting portion 430 is inclined downwardly inwardly. On the other hand, a downwardly extending projecting portion 436, elongate and rectangular in shape, is provided in a unit frame 434 in the optical unit 420. An elongate rectangular projecting opening 438 communicating with the exposure opening 432 is defined in the projecting portion 436. The lower end of the projecting portion 436, especially those parts which define both side parts of the projecting opening 438, is inwardly and downwardly inclined, and tapered corresponding to the shape of the opening portion of the projecting portion 430 of the unit frame 404. In this modified embodiment, the projecting portion 436 of the optical unit frame 434 acts as a polygonal protrusion, and the opening portion of the exposure opening 432 of the unit frame 404 acts as a polygonal receiving portion. The opening parts in the projecting portions 436 and 430 function as the positioning means and rotation hampering means. Furthermore, as will be stated hereinafter, the projecting portion of the optical unit frame 434 also acts as an actuating piece. It will be easily understood by comparing FIGS. 10 and 12 with FIGS. 15 and 17 that by this arrangement, the two actuating pieces on the left-hand side in FIG. 10 can be omitted.

Otherwise, the structure of the modified embodiment is substantially the same as that of the previous embodiment, and a detailed description thereof will be omitted.

Figure 18:
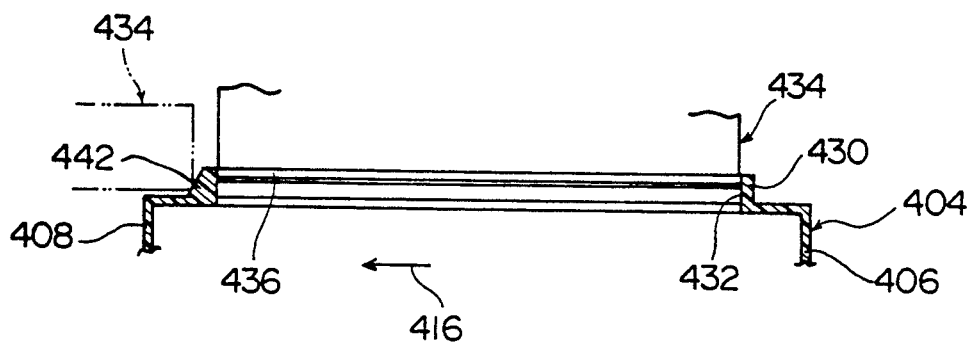
FIG. 18 is a sectional view showing the state in which a receiving section defined in a projecting portion of a unit frame in the laser beam printer of FIG. 15 is in engagement with a projecting portion of the optical unit frame.
Figure 17:
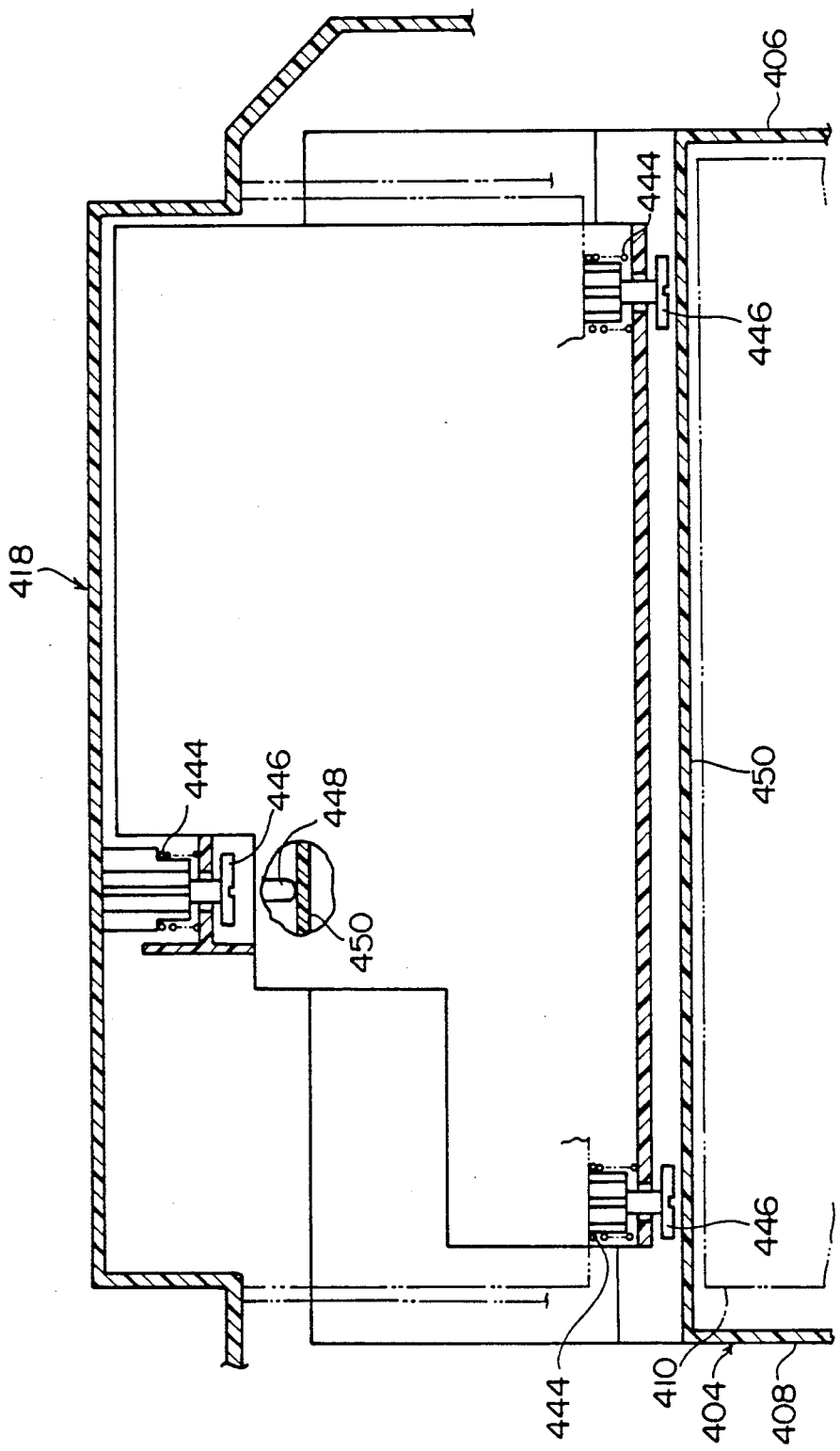
FIG. 17 is a sectional view illustrating the positional relationship between the optical unit and the process unit in the laser beam printer of FIG. 15.

To mount the process unit 402 detachably on the main body 418 of the machine in this modified embodiment, the cover member (not shown) is opened and the support projecting portions 412 and 414 of the unit frame 404 are positioned on the supporting rails 424 and 426. Then, a gripping portion 440 (FIGS. 15 and 16) of the unit frame 404 is pushed to move the unit frame in the mounting direction shown by arrow 416. As shown in FIG. 18, a surface 442 inclined downwardly toward the mounting direction shown by arrow 416 is provided in one end portion (the end portion on top in FIG. 16 and on the left side in FIG. 18) of the projecting portion 430 of the unit frame 404. Accordingly, when the unit frame 404 is moved in the direction shown by arrow 416, the action of the inclined surface 442 causes the optical unit 420 to move slightly upwardly against the biasing action of a biasing coil spring 444. This is facilitates to the smooth mounting of the process unit 402.

When the process unit frame 404 is thus inserted to a predetermined mounting position, the front end part of the projecting portion 436 of the optical unit frame 434 is received in place in the opening portion of the projecting portion 430 of the unit frame 404. Consequently, by the action of the receiving portions defined in the opening portions of the projecting portions 436 and 430, that part of the optical unit 420 which defines the projecting opening 438 is brought into vertical alignment with that part of the process unit 402 which defines the exposure opening 432, as shown by solid lines in FIG. 18 (in FIG. 18, the optical unit frame 434 is moved with respect to the unit frame 404 contrary to the actual practice). Since in the modified embodiment, the receiving portions defined in the projecting portions 436 and 430 are elongate and rectangular, they cannot rotate relative to each other in the engaged state. Accordingly, in the first modified embodiment, the optical unit 420 can move over a predetermined range in the horizontal direction (the left-right direction in FIG. 18 and the direction perpendicular to the sheet surface in FIG. 15) via fixing screws 446. However, when the process unit 402 is moved to the predetermined mounting position as described above, the receiving portions defined in the projecting portions 436 and 430 engage each other to bring the specific site of the optical unit 420 into alignment with the specific site of the process unit 402 and accurately hamper their relative rotation, as is the case with the specific embodiment described hereinabove. Thus, the optical unit 420 and the process unit 402 are maintained directly in a predetermined positional relationship via the receiving portions defined in the projecting portions 436 and 430 which act as the positioning means and the rotation hampering means. Furthermore, in this mounted state, an actuating piece 448 provided in the optical unit frame 434 acts on the upper surface of an upper wall 450 (FIG. 16), and the undersurface of the projecting portion 436 of the optical unit frame 434 acts on the upper surface of the projecting portion 430 of the unit frame 404. Thus, the optical unit 420 is slightly elevated against the biasing force of the biasing coil springs 444. Hence, the optical unit frame 434 is maintained at a fixed distance from the unit frame 404 by the action of the actuating piece 448 and the projecting portion 436 which also functions as an actuating piece. The optical unit frame 434 is maintained elastically pressed by the action of the biasing coil springs 444, and the vertical distance between the unit frame 404 and the optical unit frame 434 is maintained accurately at a fixed value. Accordingly, in the first modified embodiment, the same effect as in the specific embodiment described above can be achieved.

Figure 19:
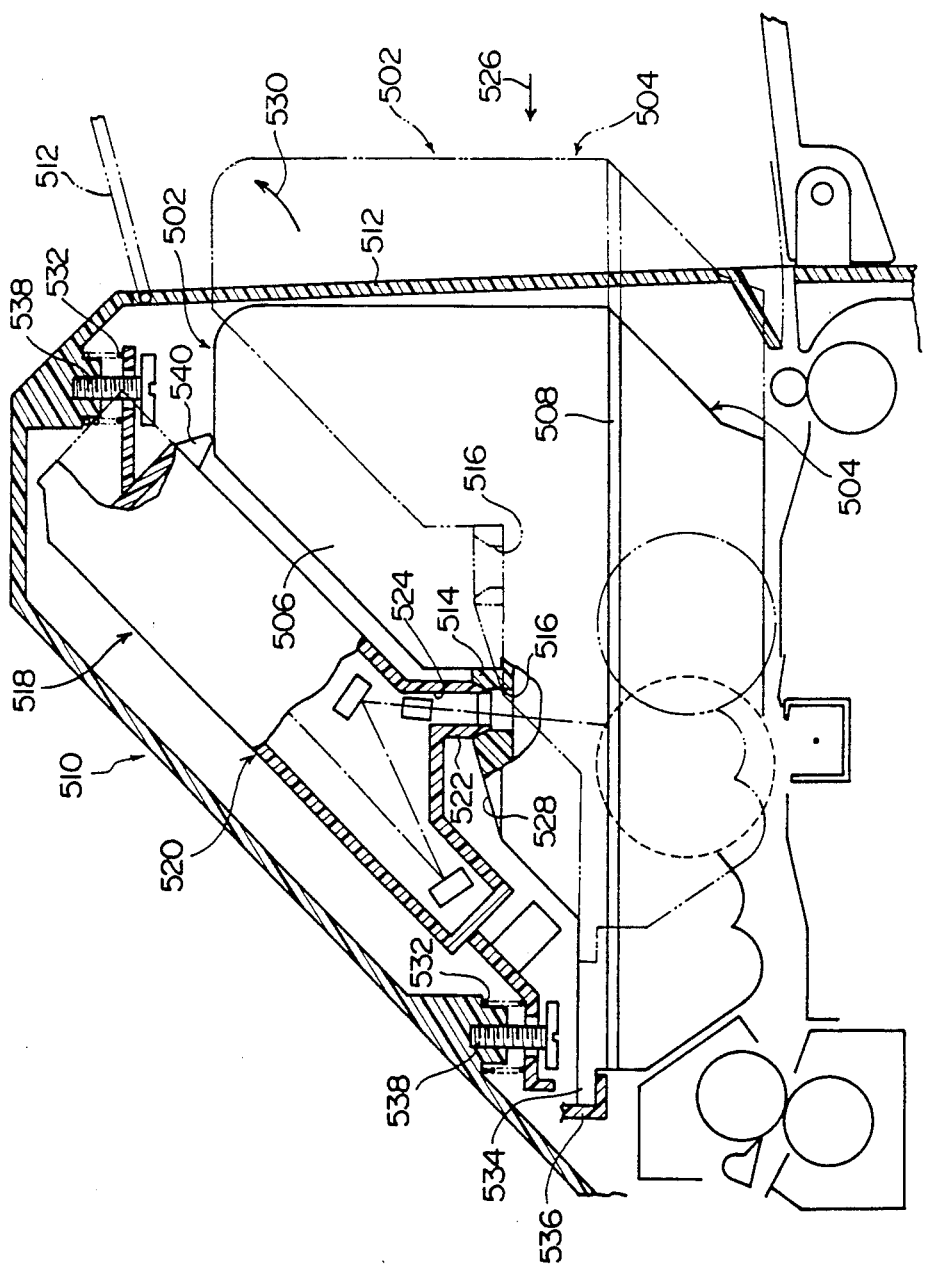
FIG. 19 is a sectional view showing in a simplified manner a process unit and optical unit and vicinities thereof in a second modified embodiment of the laser beam printer.

FIG. 19 shows a second modified embodiment of the laser beam printer. In the second modified embodiment, the process unit is moved in a direction perpendicular to the axial direction of the rotating drum, and is mounted on the main body of the machine.

With reference to FIG. 19, a process unit 502 is basically of the same structure as in the above-described specific embodiment. Support protrusions 508 extending in the left-right direction in FIG. 19 are provided in a pair of end walls 506 (only one of which is shown) of process unit frame 504. On the other hand, supporting rails (not shown) constituting a supporting means corresponding to the support protrusions 508 are provided on the main body 510. A cover member 512 is provided at that part of the main body 510 which defines the right surface in FIG. 19, and the upper end portion of the cover member 512 is pivotally linked to the main body of the machine. Accordingly, the cover member 512 is free to pivot between a closed position shown by solid lines and an open position shown by two-dot chain lines in FIG. 19.

In the second modified embodiment, an elongate rectangular projecting portion 514 is provided in the upper wall of the process unit frame 504 as in the first modified embodiment, and a rectangular exposure opening 516 is defined in the projecting portion 514. A downwardly extending projecting portion 522 is provided on an optical unit frame 520 of an optical unit 518, and an elongate rectangular projecting opening 524 is defined in the rectangular projecting portion 522. The opening part of the exposure opening 516 in the projecting portion 514 acts as a polygonal receiving portion and the front end portion of the projecting portion 522 acts as a polygonal protrusion, and these parts function as a positioning means and a rotation hampering means as in the first modified embodiment. The projecting portion 522 of the optical unit frame 520 function also as an actuating piece for maintaining the distance between the optical unit frame 520 and the unit frame 504 constant. An inclined surface 528 inclined downwardly in the mounting direction shown by an arrow 526 is formed at one side part (the side part on the downstream side as viewed in the mounting direction shown by arrow 526) of the projecting portion 514 of the unit frame 504. Otherwise, the structure of the second modified embodiment is substantially the same as the specific embodiment described hereinabove.

To mount the process unit 502 detachably on the main body 510 of the machine in the second modified embodiment, the cover member 512 is pivoted in the direction shown by an arrow 530 to the open position shown by the two-dot chain lines in FIG. 19. Then, the support protrusions 508 of the unit frame 504 are positioned on the supporting rails (not shown) and the process unit 502 is moved in the mounting direction of arrow 526. As a result of this movement of the process unit 502, the inclined surface 528 of the projecting portion 514 of the unit frame 504 acts on the lower end of the projecting portion 522 of the optical unit frame 520 to move the optical unit 518 slightly upwardly against the biasing action of biasing coil springs 532. This facilitates the smooth mounting of the process unit 502.

When the process unit 502 is thus inserted to a predetermined mounting position, a projecting piece 534 provided in the unit frame 504 abuts with a stop member 536 of the main body 510 of the machine thereby to hamper accurately the movement of the process unit 502 beyond the mounting position. When the process unit 502 has thus been mounted at the mounting position, the projecting portion 522 of the optical unit frame 520 is received in the opening part of the projecting portion 514 of the unit frame 504. As a result, by the action of the receiving portions defined in the opening portions of the projecting portions 522 and 514, that part of the optical unit 518 which defines the projecting opening 524 and that part of the process unit 502 which defines the exposure opening 516 are brought into vertical alignment with each other. Furthermore, since the receiving portions defined in the projecting portions 522 and 514 are elongate and rectangular, their relative rotation is hampered when the projecting portion 522 is received in the receiving portion of the projecting portion 514. Accordingly, in the second modified embodiment, the optical unit 518 is free to move horizontally (in the left-right direction and the direction perpendicular to the sheet surface in FIG. 19) over a predetermined range via a fixing screws 538. However, when the process unit 502 is held at the predetermined mounting position as described above, the projecting portion 522 engages the receiving portion of the projecting portion 514. As a result, the specific part of the optical unit 518 is brought into alignment with the specific part of the process unit 502 and their relative rotation is hampered. Thus, the optical unit 518 and the process unit 502 are maintained directly in a predetermined positional relationship via the projecting portion 522 and the receiving portion of the projecting portion 514 acting as the positioning means and rotation hampering means. Furthermore, when the process unit 502 is so mounted, an actuating piece 540 provided on the optical unit frame 520 acts on the upper wall of the unit frame 504 and the undersurface of the projecting portion 522 of the unit frame 520 acts on the upper surface of the projecting portion 514 of the unit frame 504. As a result, the optical unit 518 is slightly elevated against the biasing force of the biasing coil springs 532. Hence, the optical unit frame 520 is maintained at a fixed distance from the unit frame 504 by the action of the actuating piece 540 and the projecting portion 522 which functions as an actuating piece, and the two are elastically maintained in press contact with each other by the action of the biasing coil springs 532. Accordingly, in the second modified embodiment, the same effect as in the specific embodiment described hereinabove can be achieved.

In the first and second modified embodiments, the projecting portion (in which the projecting opening is defined) provided on the optical unit frame is adapted to be received in the receiving portion defined in the projecting portion (in which the exposure opening is defined) of the process unit frame. On the contrary, it is possible to adapt the projecting portion of the process unit frame to be received in the projecting portion (the part which defines a receiving portion) of the optical unit frame. Furthermore, in place of the projecting portion of the optical unit and the projecting portion of the process unit frame, a polygonal protrusion and a polygonal receiving portion for exclusive use which function as the positioning means and the rotation hampering means may be provided on the optical unit and the process unit.

FIG. 20 shows a third modified embodiment of the laser beam printer. In the third modified embodiment, the optical unit is mounted on the main body of the machine (its lower section), and a main portion of a conveying means for conveying sheet material and the process unit are mounted on an opening-closing housing attached to the lower section of the main body so as to be opened or closed.

With reference to FIG. 20, the laser beam printer of the third modified embodiment is provided with a main body 602. The main body 602 of the machine is comprised of a lower section 603 and an opening-closing housing 606 connected to the right end portion in FIG. 20 of the lower section 603 via a shaft member 604. The housing 606 is free to pivot between a closed position shown by solid lines in FIG. 20 (constituent elements mounted on the main body 602 and constituent elements mounted on the housing 606 are maintained in the positional relationship shown by solid lines) and an open position shown by two-dot chain lines (at which a process unit 608 can be detached from the housing 606 in the manner to be described).

An optical unit 610 is mounted on the lower section 603 of the main body in the following manner.

A pair of fixing walls 614 and 616 spaced from each other in the left-right direction in FIG. 20 are provided on a bottom wall 612 of the main body 602. At opposite ends of each of the fixing walls 614 and 616 are provided inwardly projecting abutting protrusions 618 and 620 (only one pair is shown in FIG. 20), and inwardly projecting upper abutting protrusions 622 and 624 are formed at the upper ends of the fixing walls 614 and 616. The optical unit 610 is mounted between the fixing walls 614 and 616, as shown in FIG. 20. In this mounted state, the optical unit 610 is free to move in the left-right direction in FIG. 20 from a position at which it abuts with one fixing wall 614 to a position at which it abuts with the other fixing wall 616, and is also free to move in a direction perpendicular to the sheet surface in FIG. 20 from a position at which it abuts with the abutting protrusions 618 and 620 in one of the fixing walls 614 and 616 to a position at which it abuts with the abutting protrusions 618 and 620 of the other fixing wall. As seen from FIG. 20, the optical unit 610 is also free to move vertically from a position at which it abuts with the bottom wall 612 of the main body 602 of the machine to a position at which it abuts with the upper abutting protrusions 622 and 624 of the fixing walls 614 and 616. In the third modified embodiment, a plurality of biasing coil springs 628 are interposed between the bottom wall 612 and an optical unit frame 626 of the optical unit 610. These biasing coil springs 628 elastically bias the optical unit frame 626 upwardly.

The process unit 608 is detachably mounted on the housing 606 in the following manner. Supporting rails 630 and 632 spaced from each other in the left-right direction in FIG. 20 are provided in the housing 606. One supporting rail 630 is L-shaped in cross section and in cooperation with a guide plate 633 mounted on the housing 606, defines a guide groove. The other supporting rail 632 is rectangular in cross section, and a guide groove is defined in one side surface (the left side surface in FIG. 20). The process unit 608 is provided with a process unit frame 634, and support protrusions 636 and 638 corresponding to the supporting rails 630 and 632 are provided at opposite side ends of the unit frame 634 in the left-right direction in FIG. 20.

In the third modified embodiment, three circular protrusions 640 (two of which are shown in FIG. 20) are provided in the upper wall of the optical unit frame 626, and circular receiving holes are defined in the circular protrusions 640. Pins 642 corresponding to the circular receiving holes are provided in the bottom wall of the process unit frame 634, and the tip portion of each of the pins 642 is tapered. In the third modified embodiment, one pin 642 and the receiving hole of the circular protrusion 640 receiving it function as the positioning means. The other two pins 642 and the receiving holes of the circular protrusions 640 function as the rotation hampering means. Furthermore, the three pins 642 act as actuating pieces for maintaining the distance between the unit frame 634 and the optical unit frame 626 constant. The other basic structures of the third modified embodiment are nearly the same as in the specific embodiment described hereinabove.

To mount the process unit 608 detachably on the main body 602 of the machine in the third modified embodiment, the opening-closing housing 606 is pivoted in the direction shown by an arrow 644 to the open position shown by the two-dot chain lines. Then, the support protrusions 636 and 638 of the unit frame 634 are positioned in the guide grooves of the supporting rails 630 and 632, and the unit frame 634 is moved to a predetermined mounting position along the guide grooves in a direction perpendicular to the sheet surface in FIG. 20. Thereafter, the housing 606 having the process unit 608 mounted thereon is brought from the open position to the closed position. At the closed position, the pins 642 provided in the unit frame 634 are received detachably in the receiving holes of the corresponding circular protrusions 640. As a result, the process unit 608 and the optical unit 610 are maintained in the positional relationship shown in FIG. 20. Specifically, the optical unit frame 610 is free to move horizontally over a predetermined range, but when the housing 606 is held at the closed position, the pins 642 are received in the receiving holes of the corresponding circular protrusions 640 to bring the specific part of the optical unit 610 into vertical alignment with the specific part of the process unit 608 and to hamper relative rotation therebetween. Thus, the optical unit 610 and the process unit 608 are maintained directly in a predetermined positional relationship via the pins 642 and the receiving holes of the protrusions 640 acting as the positioning means and the rotation hampering means. Furthermore, as a result of this mounting, the tip surfaces of the pins 642 abut with those parts of the circular protrusions 640 which define the bottom surfaces of the receiving holes, and the optical unit 610 is slightly lowered against the biasing force of the biasing coil springs 628. Accordingly, the optical unit frame 626 is maintained at a fixed distance from the unit frame 634 by the action of the pins 642 which function as actuating pieces, and the two are maintained elastically in a pressure contact condition by the action of the biasing coil springs 628. Accordingly, in the third modified embodiment, the process unit 608 and the optical unit 610 can be maintained accurately in a predetermined positional relationship as in the above specific embodiment.

We claim:

1. In an image-forming machine comprising a main body including an upper wall, an image-bearing means in the form of a rotating drum including a surface having a photosensitive material thereon, an optical means for projecting light having image information onto said photosensitive material on said surface, a developing device for developing a latent electrostatic image formed on said surface, a transfer means for transferring a toner image formed on said surface in a transfer zone to a sheet material, a conveying mechanism for conveying the sheet material through said transfer zone, and a receiving section for receiving the sheet material conveyed by said conveying mechanism, the improvement wherein:

said receiving section is disposed above said optical means and includes a receiving surface defined by an upper surface of said upper wall of said main body, said receiving surface being inclined upwardly at a predetermined angle to the horizontal;

said optical means is disposed in a box-like optical unit frame, and said optical unit frame is disposed within said main body at a location above said rotating drum and extending substantially parallel to said receiving surface of said receiving section and inclined upwardly from a lower first end on a first side of said rotating drum to an upper second end on a second side of said rotating drum, thereby defining an enlarged space below said optical unit frame on said second side of said rotating drum;

a main portion of a light path of said optical means is inclined to the horizontal substantially parallel to said receiving surface of said receiving section in a straight line from one end portion to another end portion of said optical unit frame; and said developing device is positioned in said enlarged space below said optical unit frame at a location on said second side of said rotating drum.

2. The improvement claimed in claim 1, wherein said optical unit frame is mounted on an inside surface of said upper wall of said main body.

3. The improvement claimed in claim 1, wherein said predetermined angle of inclination of said receiving surface is about 45 degrees.

4. The improvement claimed in claim 1, wherein said developing device includes toner application means for applying toner to said surface of photosensitive material and a toner holding chamber for holding the toner, said toner applicator means is positioned adjacent said rotating drum, and said toner holding chamber is disposed outwardly of said toner application means.

5. In an image-forming machine comprising a main body and a process unit mounted on said main body, said process unit including an image-bearing means with a photosensitive material thereon, and said main body having provided therein an optical unit for projecting light having image information onto a surface of said photosensitive material of said image-bearing means, the improvement wherein:

said optical unit is mounted on said main body so that it is free to move over a predetermined range toward and away from said process unit; and said machine further comprises:

biasing means for biasing said optical unit toward said process unit and for maintaining said optical unit and said process unit in pressing contact with each other;

positioning means for bringing a specific site of said process unit into substantial alignment with a specific site of said optical unit; and rotating hampering means for hampering relative rotation of said process unit and said optical unit about their specific sites.

6. The improvement claimed in claim 5, wherein said positioning means and said rotating hampering means are provided on said process unit and said optical unit, and said process unit and said optical unit are directly positioned via said positioning means and said rotation hampering means.

7. The improvement claimed in claim 5, wherein said positioning means and said rotating hampering means comprise separate members, said positioning means comprises a positioning protrusion provided on one of said process unit and said optical unit and a receiving portion provided in the other of said process unit and said optical unit, and said rotation hampering means comprises a rotation hampering protrusion provided on one of said process unit and said optical unit and a receiving portion provided in the other of said process unit and said optical unit.

8. The improvement claimed in claim 7, wherein said positioning protrusion is integrally provided on one of a unit frame of said process unit and a unit frame of said optical unit, and said receiving portion therefore is provided integrally in the other of said unit frame of said process unit and said unit frame of said optical unit.

9. The improvement claimed in claim 7, wherein said positioning protrusion is formed of a cylindrical positioning pin, and said receiving portion therefore is formed of a circular receiving hole having an inside diameter corresponding to the outside diameter of said pin, and said rotation hampering protrusion is formed of a cylindrical rotation hampering pin, and said receiving portion therefore is formed of an elongate receiving hole having a width corresponding to the outside diameter of said rotation hampering pin.

10. The improvement claimed in claim 7, wherein said process unit has a process unit frame having said image-bearing means mounted thereon, an exposure opening for conducting light from said optical unit to said image-bearing means is defined in said process unit frame, and said positioning means is disposed in the vicinity of said exposure opening in said process unit frame.

11. The improvement claimed in claim 5, wherein said positioning means and said rotation hampering means comprise a polygonal protrusion provided on one of said process unit and said optical unit and a polygonal receiving section corresponding to said polygonal protrusion defined in the other of said process unit and said optical unit.

12. The improvement claimed in claim 11, wherein said process unit is provided with a process unit frame having said image-bearing means mounted thereon, said optical unit is provided with an optical means for projecting-light having image information onto said surface of said photosensitive member, and said positioning means and said rotation hampering means comprise a rectangular site defining an exposure opening formed in said process unit frame and a rectangular site defining a projecting opening formed in said optical unit frame.

13. The improvement claimed in claim 5, wherein said main body comprises a lower section and an opening-closing housing mounted on said lower section so as to be free to pivot between an open position and a closed position, said optical unit is mounted on said opening-closing housing so that said optical unit is free to move relatively to said process unit, and when said opening-closing housing is held at said closed position, said process unit and said optical unit are maintained in a specified positional relationship by said positioning means and said rotation hampering means.

14. The improvement claimed in claim 13, wherein opposite end portions of said process unit are mounted detachably on said lower section of said main body via a pair of supporting means, one of said supporting means supports the respective said end portion of said process unit pivotally and the other end supporting means act son the other respective said end portion of said process unit to hamper pivoting of said process unit beyond a predetermined position.

15. The improvement claimed in claim 5, further comprising a pair of spaced supporting means extending in a mounting direction and disposed in said main body for detachably mounting said process unit on said main body such that said process unit and said optical unit are maintained in a predetermined positional relationship by said positioning means and said rotation hampering means.

16. The improvement claimed in claim 5, further comprising an activating member provided on one of side process unit and said optical unit and acting on the other of said process unit and said optical unit, for moving said optical unit slightly away from said process unit against the biasing action of said biasing means, and therefore for maintaining constant the distance between said optical unit and said process unit, whereby said optical unit is brought into pressing contact with said process unit via said actuating member.

17. The improvement claimed in claim 16, wherein said actuating member is integrally provided on one of a unit frame of said optical unit and a unit frame of said process unit.

18. The improvement claimed in claim 5, wherein said process unit includes driving means for moving said image-bearing means in a predetermined direction, and said biasing means biases a driven member in said driving means of said process unit toward a driving member in a driving system provided in said main body.

19. The improvement claimed in claim 5, further comprising a charge eliminating lamp, for erasing a residual charge on said photosensitive material, mounted on said optical unit.

20. In an image-forming machine comprising a main body and a process unit mounted on said main body, said process unit including an image-bearing means with a photosensitive material thereon, and said main body having provided therein an optical unit for projecting light having image information onto a surface of said photosensitive material of said image-bearing means, the improvement wherein:
said optical unit is mounted to be free to move over a predetermined range toward and away from said process unit;
biasing means is provided for biasing said optical unit toward said process unit and for maintaining said optical unit and said process unit in pressing contact with each other; and
an actuating member is provided on one of said process unit and said optical unit and acting on the other of said optical unit and said processing unit for moving said optical unit slightly away from said process unit against the biasing action of said biasing means and therefore for maintaining constant the distance between said optical unit and said process unit, whereby said optical unit is brought into pressing contact with said process unit via said actuating member.

21. The improvement claimed in claim 20, wherein said main body includes a lower section and an opening-closing housing mounted on said lower section so as to be free to pivot between an open position and a closed position, said optical unit is mounted on said opening-closing housing so that said optical unit is free to move toward and away from said process unit, and when said opening-closing housing is held at said closed position, said processing unit and said optical unit are maintained in said pressing contact with each other by said actuating member.

22. The improvement claimed in claim 20, further comprising a pair of spaced supporting means extending in a mounting direction and disposed in said main body for detachably mounting said process unit on said main body such that said process unit and said optical unit are maintained in said pressing contact with each other by the action of said biasing means.

23. In an image-forming machine comprising a main body, image-bearing means having a surface with a photosensitive material thereon, a latent electrostatic image-forming means for forming a latent electrostatic image on said surface of photosensitive material, a developing device for developing the latent electrostatic image so formed to a toner image, and a cleaning device having means for removing toner remaining on said surface of photosensitive material after transferring of the toner image, said image-bearing means and said cleaning device being mounted on a unit frame mounted detachably on said main body, the improvement wherein:
said unit frame comprises a first frame member and a second frame member mounted pivotally on said first frame member;
said first frame member has defined therein a receiving portion for detachably receiving said image-bearing means;
said image-bearing means is mounted rotatably in said receiving portion;
said toner removing means is disposed on said second frame member;
such that, when said second frame member is pivoted in a closing direction and held at an operative position, said toner removing means acts on said surface of said image-bearing means, and when said second frame member is pivoted in an opening direction away from said operative position, said toner removing means moves away from said image-bearing means; and
said first frame member and said second frame member have provided therein a non-operative position locking means for releasably locking said second frame member at a non-operative position at which said toner removing means does not substantially act on said surface of said image-bearing means.

24. The improvement claimed in claim 23, wherein said receiving portion is opened upwardly and receives said image-bearing means from above, such that said receiving portion restrains downward and lateral movement of said image-bearing means, and when said second frame member is at said operative position said second frame member is above said image-bearing means and restrains upward movement thereof.

25. The improvement claimed in claim 24, wherein said receiving portion includes an upper part having an enlarged portion to facilitate mounting and detaching of said image-bearing means.

26. The improvement claimed in claim 23, wherein said first frame member and said second frame member include an operative position-locking means for locking said second frame member releasably at said operative position.

27. The improvement claimed in claim 23, wherein said image-bearing means comprises a rotating drum including a cylindrical portion having said photosensitive material disposed on a peripheral surface thereof and shaft portions disposed on opposite ends of said cylindrical portion and rotatably supported by said receiving portion, and further comprising first guide portions corresponding to opposite end portions of said cylindrical portion and second guide portions corresponding to said shaft portions and provided on said first frame member, such that in mounting said rotating drum in said receiving portion said cylindrical portion of said rotating drum is guided along said first guide portions and then said shaft portions are guided along said second guide portions.

28. The improvement claimed in claim 23, wherein said cleaning device includes a toner recovery chamber for recovering toner removed by said toner removing means.

29. The improvement claimed in claim 23, wherein said toner removing means is constructed of an elastic blade acting on said surface of said image-bearing means.

* * * * *